United States Patent
Nozawa et al.

(10) Patent No.: US 9,709,444 B2
(45) Date of Patent: Jul. 18, 2017

(54) MOTOR CONTROLLER, ELECTRIC VEHICLE, AND HEAT STRESS ESTIMATION METHOD FOR SWITCHING ELEMENT

(71) Applicant: TOYOTA JIDOSHA KABUSHIKI KAISHA, Toyota-shi, Aichi-ken (JP)

(72) Inventors: Natsuki Nozawa, Toyota (JP); Etsushi Taguchi, Kasugai (JP); Kento Taguri, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/954,217

(22) Filed: Nov. 30, 2015

(65) Prior Publication Data

US 2016/0155278 A1    Jun. 2, 2016

(30) Foreign Application Priority Data

Dec. 2, 2014   (JP) .................................. 2014-244193

(51) Int. Cl.
  *G07C 5/08*    (2006.01)
  *G01K 3/10*    (2006.01)
  (Continued)

(52) U.S. Cl.
  CPC ................ *G01K 3/10* (2013.01); *B60K 6/445* (2013.01); *B60L 3/003* (2013.01); *B60W 10/06* (2013.01);
  (Continued)

(58) Field of Classification Search
  CPC ............................... G07C 5/0808; G01K 3/10
  See application file for complete search history.

(56) References Cited

U.S. PATENT DOCUMENTS

2004/0000144 A1\* 1/2004 Rajamani .................. F02C 9/28
                                                                   60/772
2005/0071090 A1\* 3/2005 Katou ..................... H02M 7/48
                                                                   702/34
(Continued)

FOREIGN PATENT DOCUMENTS

JP       H03-261877 A       11/1991
JP          09028678 A   \*   2/1997
(Continued)

*Primary Examiner* — Tuan C. To
(74) *Attorney, Agent, or Firm* — Oliff PLC

(57) ABSTRACT

The specification is related to a motor controller, a vehicle including the motor controller and a heat stress estimating method for a switching element. The motor controller includes a switching element, a temperature sensor, and a computer. The switching element is configured to convert output electric power of an electric power supply into motor-driving electric power. The temperature sensor is configured to measure a temperature of the switching element. The computer is configured to extract a maximum point and a minimum point in a time-dependent change in the temperature of the switching element, the computer is configured to calculate a temperature difference between the maximum point and the minimum point adjacent to each other and configured to calculate an estimated value of a heat stress to which the switching element is subjected based on each calculated temperature difference.

9 Claims, 12 Drawing Sheets

(51) Int. Cl.
*B60W 10/08* (2006.01)
*H02M 1/32* (2007.01)
*B60K 6/445* (2007.10)
*B60L 3/00* (2006.01)
*B60W 10/06* (2006.01)
*B60W 10/30* (2006.01)
*B60W 30/184* (2012.01)
*B60W 20/50* (2016.01)

(52) U.S. Cl.
CPC ............ *B60W 10/08* (2013.01); *B60W 10/30* (2013.01); *B60W 20/50* (2013.01); *B60W 30/1843* (2013.01); *H02M 1/32* (2013.01); *G01K 2205/00* (2013.01); *H02M 2001/327* (2013.01); *Y02T 10/642* (2013.01)

(56) References Cited

U.S. PATENT DOCUMENTS

| | | | | |
|---|---|---|---|---|
| 2007/0047614 A1* | 3/2007 | Lee | ........................ | G01N 25/18 374/44 |
| 2009/0020588 A1* | 1/2009 | Saito | .................... | B23K 1/0008 228/103 |
| 2009/0064653 A1* | 3/2009 | Hagen | .................... | B60H 1/032 60/39.3 |
| 2010/0014323 A1* | 1/2010 | Sato | ...................... | H02M 5/458 363/17 |
| 2010/0085019 A1* | 4/2010 | Masuda | ................ | H02J 7/1453 320/152 |
| 2011/0118917 A1* | 5/2011 | Lim | ........................ | B60K 6/48 701/22 |
| 2012/0041600 A1* | 2/2012 | Michael | ............ | G05D 23/1932 700/276 |
| 2012/0112669 A1* | 5/2012 | Kitanaka | .................... | B60L 7/16 318/3 |
| 2013/0135906 A1* | 5/2013 | Kawamura | ............. | H01L 23/36 363/40 |
| 2014/0354204 A1* | 12/2014 | Tachibana | ................. | H02P 6/08 318/473 |
| 2015/0022405 A1* | 1/2015 | Shi | ......................... | G01R 29/10 343/703 |
| 2015/0049527 A1* | 2/2015 | Sugahara | ................ | H01L 23/34 363/80 |
| 2016/0238507 A1* | 8/2016 | Vitulano | .................. | G01N 1/02 |

FOREIGN PATENT DOCUMENTS

| | | | |
|---|---|---|---|
| JP | 10038960 A | * | 2/1998 |
| JP | 2010-165717 A | | 7/2010 |
| JP | 2011059105 A | * | 3/2011 |
| JP | 2012-019587 A | | 1/2012 |

* cited by examiner

| BIN NUMBER | TEMPERATURE RANGE (BIN WIDTH) | NUMBER OF OCCURRENCES | REFERENCE VALUE |
|---|---|---|---|
| bin1 | $A1 \leq dT < A2$ | B1 | C1 |
| bin2 | $A2 \leq dT < A3$ | B2 | C2 |
| bin3 | $A3 \leq dT < A4$ | B3 | C3 |
| bin4 | $A4 \leq dT < A5$ | B4 | C4 |

F I G . 13
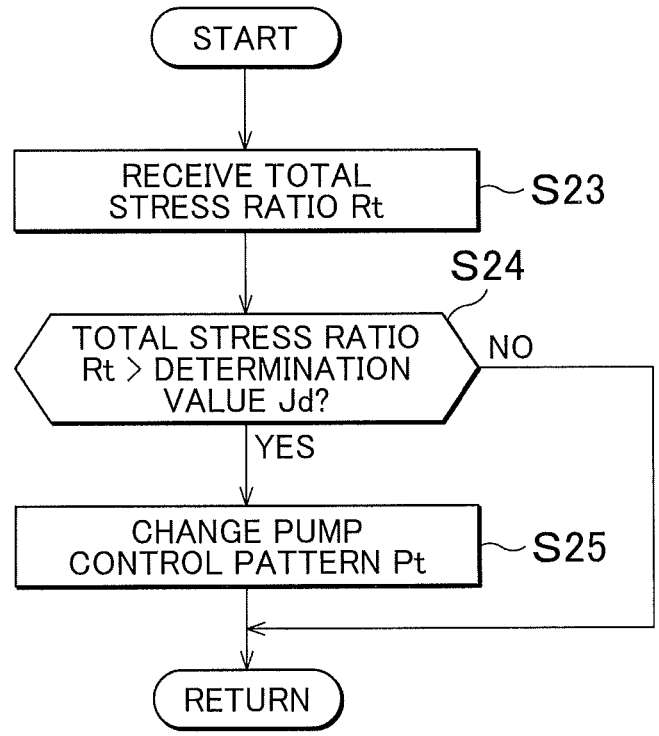

FIG. 16

| MAGNITUDE OF TEMPERATURE DIFFERENCE dT | WEIGHTING FACTOR D |
|---|---|
| dT < E1 | 1.0 |
| E1 ≤ dT < E2 | 1.5 |
| E2 ≤ dT < E3 | 2.0 |
| E3 ≤ dT | 2.5 |

MOTOR CONTROLLER, ELECTRIC VEHICLE, AND HEAT STRESS ESTIMATION METHOD FOR SWITCHING ELEMENT

INCORPORATION BY REFERENCE

The disclosure of Japanese Patent Application No. 2014-244193 filed on Dec. 2, 2014 including the specification, drawings and abstract is incorporated herein by reference in its entirety.

BACKGROUND OF THE INVENTION

1. Field of the Invention

The invention relates to a motor controller, an electric vehicle that is provided with a motor controller, and a method for estimating a heat stress to which a switching element converting output electric power of an electric power supply into motor-driving electric power is subjected.

2. Description of Related Art

A motor controller is provided with a switching element that converts output electric power of an electric power supply into motor-driving electric power. Hereinafter, the switching element that converts the source electric power into the motor-driving electric power will be simply referred to as a "switching element". The switching element is a main component of an inverter that converts direct-current electric power of the electric power supply into alternating-current electric power or a main component of a boost converter that boosts an electric power supply voltage. Some motors have a driving electric power of at least 10 kilowatts, and a large current flows through the switching element for the motor that has such a large output. Accordingly, the switching element is prone to having a high heating value and having a high temperature. In the meantime, an electric vehicle frequently repeats start and stop and frequently repeats acceleration and deceleration, and thus the temperature of the switching element frequently changes. Not only the electric vehicle but also a motor for driving a joint of a robot frequently repeats start and stop and frequently repeats acceleration and deceleration, and thus the temperature of the switching element frequently changes. Due to the change in the temperature of the switching element, the switching element (or components around the switching element) repeats expansion and contraction. The switching element (or the components around the switching element) is subjected to damage during each expansion or contraction. In this specification, the damage to the switching element that is attributable to the temperature change will be referred to as a "heat stress". A performance of the switching element is reduced when the heat stress that the switching element is subjected to exceeds a predetermined amount.

Japanese Patent Application Publication No. 2012-19587 (JP 2012-19587 A) discloses a technique for suppressing an excessive heat stress. The motor controller that is disclosed in JP 2012-19587 A is a device mounted in an electric car and supplying electric power to a traveling motor. The technique that is disclosed in JP 2012-19587 A is as follows. The motor controller that is disclosed in JP 2012-19587 A counts a set of a rise and a fall in the temperature of the switching element as one heat stress and obtains a difference between a minimum value and a maximum value of the temperature of the switching element therebetween (the amount of temperature change). In addition, the motor controller obtains a distribution (actual result distribution) in which the amount of the temperature change is on a horizontal axis and a frequency of appearance of each temperature conversion amount (the number of occurrences) is on a vertical axis. The motor controller has a desirable reference distribution of the amount of the temperature change and the frequency of appearance (the number of occurrences) stored in advance, and intensifies cooling of the switching element such that the actual result distribution becomes close to the reference distribution when the actual result distribution is shifted toward a side of a larger amount of the temperature change with respect to the reference distribution.

In the technique according to JP 2012-19587 A, the set of the rise in the switching element temperature and the fall in the switching element temperature is counted as one heat stress. Multiple maximum points and multiple minimum points appear in a time-dependent change in the temperature of the switching element. Accordingly, the temperatures at the minimum points which are adjacent to each other on a time axis are not necessarily equal to each other. In the case of a turn toward another temperature rise from a temperature that is higher than a temperature at an initiation of a temperature rise, the temperature of the switching element might fall to a temperature that is lower than the temperature at the initiation of the temperature rise. Then, the damage (that is, the heat stress) to which the switching element is subjected might be different in a temperature-rising phase and a temperature-lowering phase. The technique that is disclosed in JP 2012-19587 A does not take this difference into account.

SUMMARY OF THE INVENTION

This specification provides a technique for accurately estimating a heat stress that a switching element which has a motor controller is subjected to.

The specification is related to a motor controller. The motor controller includes a switching element, a temperature sensor, and a computer. The switching element is configured to convert output electric power of an electric power supply into motor-driving electric power. The temperature sensor is configured to measure a temperature of the switching element. The computer is configured to extract a maximum point and a minimum point in a time-dependent change in the temperature of the switching element, the computer is configured to calculate a temperature difference between the maximum point and the minimum point adjacent to each other and configured to calculate an estimated value of a heat stress to which the switching element is subjected based on each calculated temperature difference.

In the above-described motor controller, the temperature difference is calculated in each of a rising phase (from the minimum point to the subsequent maximum point) and a lowering phase (from the maximum point to the subsequent minimum point) in the time-dependent change in the temperature of the switching element and is reflected in the estimated value of the heat stress. Accordingly, the obtained estimated value of the heat stress is accurate. The obtained estimated value is used in, for example, controlling of a cooler for the switching element.

Processing by the above-described computer may be performed in real time or may be performed offline after accumulation of switching element temperature data. For example, the motor controller may have time-series data on the temperature of the switching element stored in a memory. During maintenance of the motor controller, maintenance staff may obtain the estimated value of the heat stress of the switching element by using the time-series data and the above-described processing. The estimated value can be utilized during the maintenance of the motor controller. This specification also presents a method for estimating the heat stress to which the switching element of the motor controller is subjected. The switching element is configured to convert output electric power of an electric power supply into motor-driving electric power. The motor controller includes a computer. The estimation method includes: extracting, by the computer, a maximum point and a minimum point in a time-dependent change in a temperature of the switching element; calculating, by the computer, a temperature difference from the maximum point to a subsequent minimum point and a temperature difference from the minimum point to a subsequent maximum point; and calculating, by the computer, an estimated value of a heat stress to which the switching element is subjected based on each calculated temperature difference. These processing allow the heat stress to which the switching element is subjected to be obtained with a high level of accuracy.

The motor controller that is disclosed in this specification may be applied to an electric vehicle which is provided with a traveling motor in particular. A vehicle includes a traveling motor, a refrigerant circulation path configured to cool a switching element, a pump configured to circulate a refrigerant, and a motor controller. The motor controller includes a switching element, a temperature sensor, and a computer. The switching element is configured to convert output electric power of an electric power supply into motor-driving electric power. The temperature sensor is configured to measure a temperature of the switching element. The computer may be configured to extract a maximum point and a minimum point in a time-dependent change in the temperature of the switching element. The computer may be configured to calculate a temperature difference between the maximum point and the minimum point adjacent to each other and configured to calculate an estimated value of a heat stress to which the switching element is subjected based on each calculated temperature difference. The computer may be configured to increase an output of the pump with respect to a predetermined refrigerant temperature to a higher level in a case where the estimated value exceeds a predetermined determination value than before the estimated value exceeds the determination value, or, the computer may be configured to increase an output of the pump with respect to a predetermined refrigerant temperature as a rate of increase per unit time in the estimated value or a rate of increase per unit traveling distance in the estimated value increases.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a flowchart of an example of a processing for electric pump control switching using the total stress ratio;

FIG. 16 is a table illustrating an example of a weighting factor.

DETAILED DESCRIPTION OF EMBODIMENTS

Figure 1:
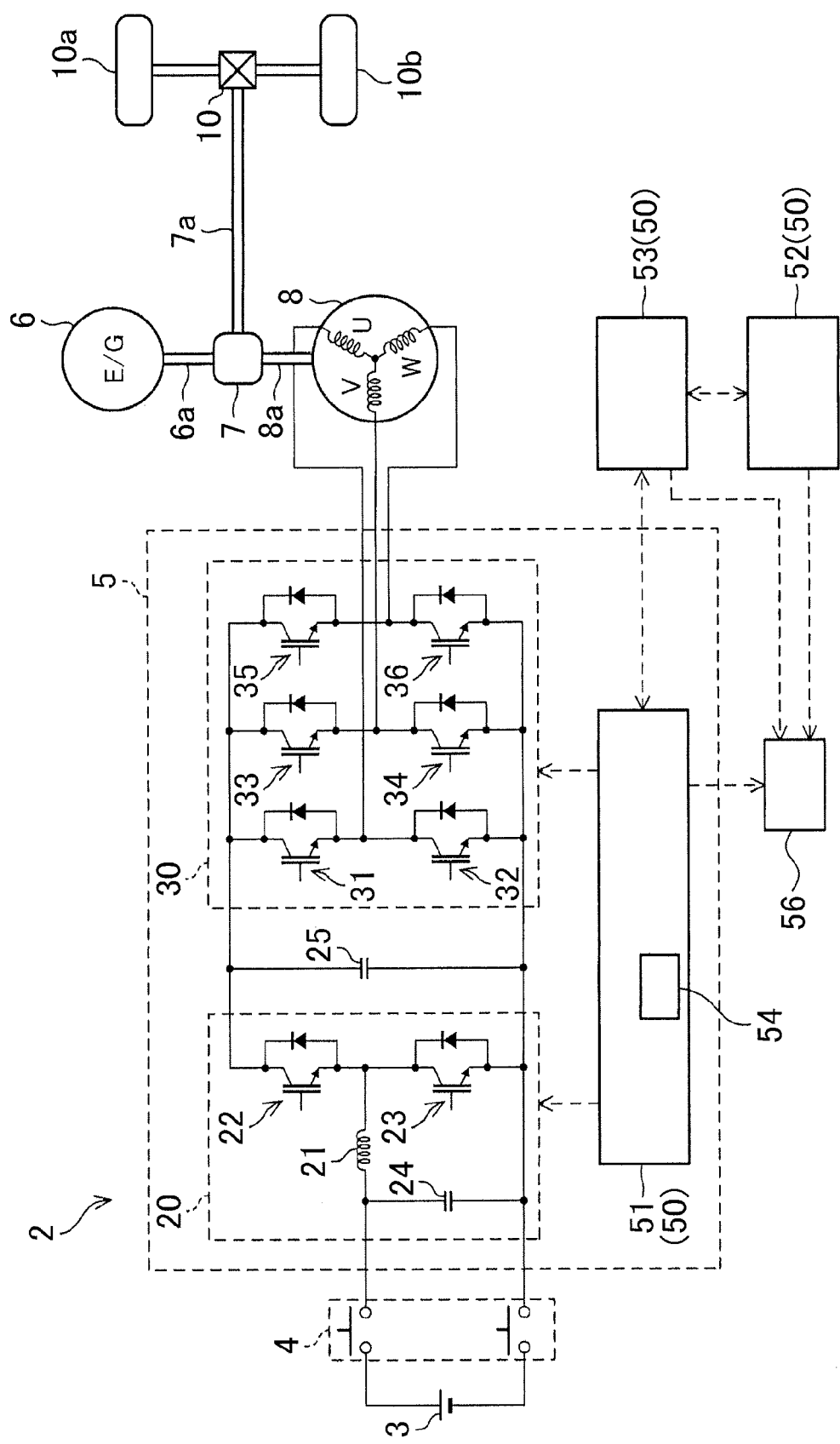
FIG. 1 is a block diagram illustrating a configuration of a drive system of a hybrid car including a motor controller according to a first embodiment.

A first embodiment of a motor controller will be described with reference to accompanying drawings. The motor controller according to this embodiment is mounted in a hybrid car 2 and converts electric power of a main battery 3 into electric power suitable for a traveling motor 8. A configuration of the hybrid car 2 according to this embodiment will be described with reference to FIG. 1. FIG. 1 is a block diagram illustrating a configuration of a drive system of the hybrid car 2. In FIG. 1, only components that are required for a description of the technique that this specification focuses on are illustrated. It should be noted that components irrelevant to the description are not illustrated in the drawing.

The hybrid car 2 is provided with the motor 8 and an engine 6 as driving sources for traveling. An output torque of the motor 8 and an output torque of the engine 6 are appropriately distributed and synthesized by a power distribution mechanism 7. The power distribution mechanism 7 is, for example, a planetary gear. The power distribution mechanism 7 synthesizes power transmitted from an output shaft 6a of the engine 6 and power transmitted from a motor shaft 8a of the motor 8 at a predetermined ratio for output to an output shaft 7a. The output of the power distribution mechanism 7 is transmitted to drive wheels 10a, 10b via a differential gear 10. In addition, the power distribution mechanism 7 distributes the power that is transmitted from the output shaft 6a of the engine 6 to the motor shaft 8a of the motor 8 and the output shaft 7a at a predetermined ratio. In this case, the motor 8 generates electric power by a driving force of the engine 6.

The main battery 3 supplies electric power for driving the motor 8. The main battery 3 has an output voltage of, for example, 300 volts. The hybrid car 2 is provided with an auxiliary machine battery (not illustrated) as well as the main battery 3. The auxiliary machine battery is used to supply electric power to a group of devices driven at a voltage lower than the output voltage of the main battery 3. Examples of the devices include a car navigation device and a room lamp. This device group is usually referred to as "auxiliary machinery". A signal processing circuit (such as a power controller 51) of a power control unit 5 (described later) excluding a large-current circuit is another example of the auxiliary machinery. The appellation of the "main battery" is for the sake of convenience in distinguishing it from the "auxiliary machine battery".

The main battery 3 is connected to the power control unit 5 via a system main relay 4. Hereinafter, the power control unit 5 will be referred to as a "PCU 5" for convenience of description. The PCU 5 is a power device that is interposed between the main battery 3 and the motor 8. The PCU 5 corresponds to the motor controller according to this embodiment. The PCU 5 includes a voltage converter 20, an inverter 30, and the power controller 51. The voltage converter 20 boosts a voltage of the main battery 3 to a voltage suitable for driving the motor 8 (such as 600 volts). The inverter 30 converts direct-current electric power after the boosting to alternating-current electric power. The power controller 51 controls the voltage converter 20 and the inverter 30. An output of the inverter 30 corresponds to electric power supplied to the motor 8. In the PCU 5, electronic components and the like constituting the voltage converter 20 and the inverter 30 (including switching elements 22, 23, 31 to 36) are cooled by a cooling system 11 (described later).

The hybrid car 2 can generate electric power by the motor 8 using the driving force of the engine 6. In addition, the hybrid car 2 can generate electric power by the motor 8 using kinetic energy of the vehicle (deceleration energy of the vehicle during braking). This electric power generation is referred to as "regeneration". In a case where the motor 8 generates electric power, the inverter 30 converts alternating-current electric power into direct-current electric power and the voltage converter 20 is stepped down to a voltage that is slightly higher than the voltage of the main battery 3 for supply to the main battery 3.

The voltage converter 20 is a circuit that has a reactor 21, switching elements 22, 23 such as an IGBT, and a capacitor 24 as main components. Diodes (reflux diodes) for bypass of reverse-direction electric currents are connected in anti-parallel to the respective switching elements 22, 23. A capacitor 25 for smoothing an electric current that is input to the inverter 30 is connected in parallel to the voltage converter 20 on a high voltage side of the voltage converter 20 (that is, the inverter 30 side).

The inverter 30 is a circuit that has the switching elements 31, 32, 33, 34, 35, 36 as main components. The switching elements 31, 32, 33, 34, 35, 36 perform a switching operation. Hereinafter, signs "31, 32, 33, 34, 35, 36" will be expressed as "31 to 36". Diodes for current bypass are connected in anti-parallel to the respective switching elements 31 to 36 as well. Three-phase alternating-current electric power for driving the motor 8 is output when the six switching elements 31 to 36 are appropriately turned ON and OFF. The switching elements 22, 23 of the voltage converter 20 and the switching elements 31 to 36 of the inverter 30 are main devices that convert output electric power of the main battery 3 into the electric power for driving the motor 8.

The power controller 51 is an information processing device that is configured to have electronic components such as a memory 54, an MPU, and an I/O interface. The power controller 51 controls the voltage converter 20 and the switching elements 22, 23, 31 to 36 of the inverter 30. The voltage converter 20 and the inverter 30 convert input electric power when the switching elements 22, 23, 31 to 36 perform the switching operation in response to a PWM signal generated by the power controller 51. An HV controller 53 is also connected to the power controller 51. Information relating to a driver's operation is input to the HV controller 53. Examples of this information include accelerator opening degree information and brake pedal force information. The power controller 51 generates the PWM signal for controlling each of the switching elements 22, 23, 31 to 36 based on the accelerator opening degree input from the HV controller 53, the voltage of the main battery 3, and the like. Sign 52 in FIG. 1 represents a cooler controller (described later).

A diagnosis memory 56 is connected to the power controller 51, the cooler controller 52, and the HV controller 53. The diagnosis memory 56 is a non-volatile memory. The power controller 51, the cooler controller 52, and the HV controller 53 store vehicle-related information in the diagnosis memory 56 on a regular basis. The diagnosis memory 56 is provided so that vehicle state-relating information is provided for vehicle maintenance staff. A total stress ratio Rt (described later) of the switching elements is stored in the diagnosis memory 56, too.

The voltage converter 20 and the switching elements 22, 23, 31 to 36 of the inverter 30 have a high heating value. Accordingly, the electronic components including the switching elements 22, 23, 31 to 36 are cooled by the cooling system 11.

Figure 2:
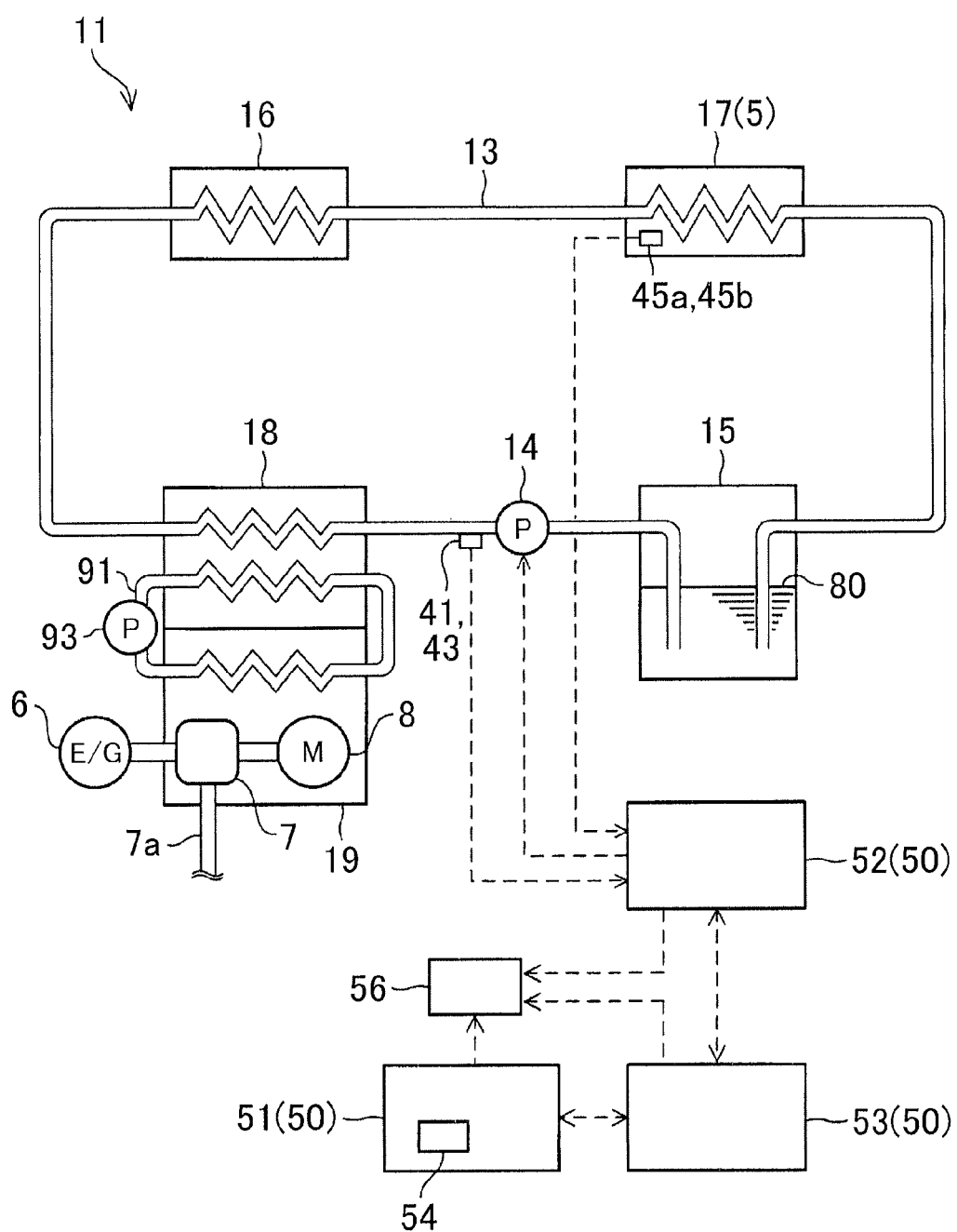
FIG. 2 is a block diagram illustrating a configuration of a cooling system of the hybrid car.

Hereinafter, a configuration of the cooling system 11 that cools the PCU 5 which includes the voltage converter 20 and the inverter 30 will be described. FIG. 2 is a block diagram illustrating the configuration of the cooling system 11 of the hybrid car 2. The cooling system 11 is provided with an electric pump 14, an oil cooler 18, a radiator 16, a PCU cooler 17, a reserve tank 15, and a cooling pipe 13 therearound. The electric pump 14 circulates a coolant 80 through the cooling pipe 13. The coolant 80 cools the PCU 5 including the voltage converter 20 and the inverter 30 and the oil cooler 18. In FIG. 2, only components that are required for the description of this specification are illustrated as in FIG. 1. It should be noted that components irrelevant to the description are not illustrated in the drawing.

The coolant 80 is, for example, a long-life coolant (LLC). The coolant 80 is a refrigerant that is stored inside the reserve tank 15 and circulates through the cooling pipe 13 after being pumped by the electric pump 14. The coolant 80 may be another liquid such as water. The oil cooler 18 cools oil with the coolant 80. This oil is circulated through an oil cooling pipe 91 by an oil pump 93 and cools a transmission 19. The transmission 19 is a gearbox that includes the motor 8 and the power distribution mechanism 7 described above. The motor 8 and the power distribution mechanism 7 are cooled by the oil that circulates through the oil cooling pipe 91.

The cooling system 11 is provided with a flow rate sensor 41 that detects a flow rate of the coolant 80 which flows through the cooling pipe 13, a temperature sensor 43 that detects a temperature of the coolant 80, and temperature sensors 45a, 45b that detect temperatures of the switching elements 22, 23, 31 to 36 which are cooled by the PCU cooler 17. The temperature sensor 45a measures the temperatures of the switching elements 22, 23 of the voltage converter 20. The temperature sensor 45b measures the temperatures of the switching elements 31 to 36 of the inverter 30. Data output from the respective sensors 41, 43 are input to the cooler controller 52 and used for output control regarding the electric pump 14.

The cooler controller 52 that controls the electric pump 14 is an information processing device that is configured to have electronic components such as a microcomputer, a memory, and an I/O interface similarly to the power controller 51. The sensors 41, 43, 45a, 45b described above and the HV controller 53 of a higher system as well as the electric pump 14 are connected to the cooler controller 52.

Figure 3:
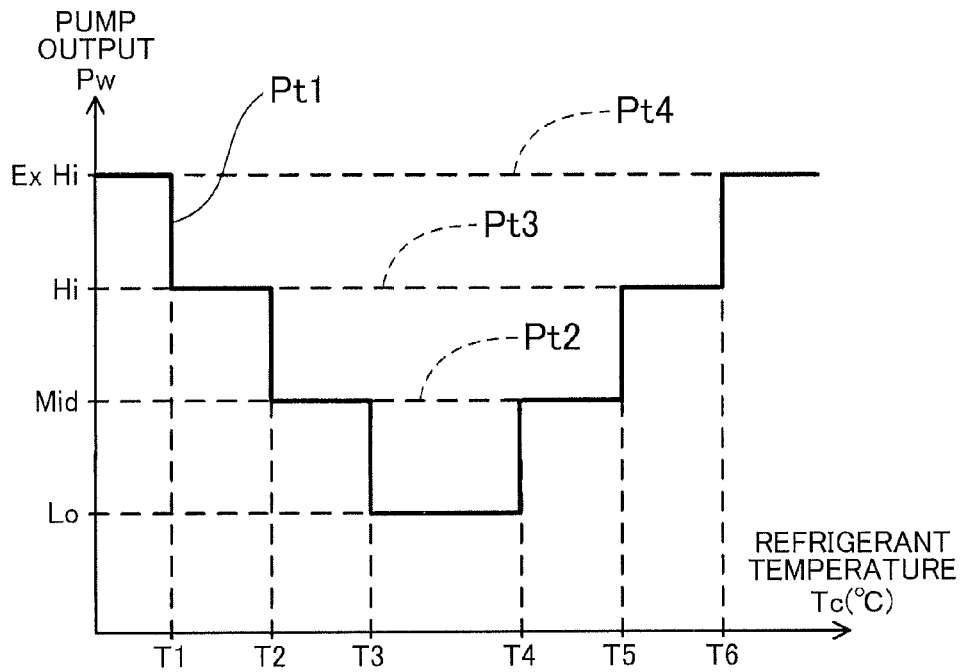
FIG. 3 is a graph illustrating an example of a relationship between a refrigerant temperature and an electric pump output.

The cooler controller 52 switches an output of the electric pump 14 in four stages mainly in accordance with a refrigerant temperature. The refrigerant temperature is measured by the temperature sensor 43 as described above. FIG. 3 shows an example of a relationship between the refrigerant water temperature and the output of the electric pump 14. The four stages of the output of the electric pump 14 refer to ExtraHigh (ExHi), High (Hi), Middle (Mid), and Low (Lo) starting from the highest one. The cooler controller 52 switches the output of the electric pump 14 in accordance with the refrigerant temperature and stores four types of control patterns. For convenience of description, symbol Tc will be used to refer to the refrigerant temperature and symbol Pw will be used to refer to the output of the electric pump 14. A first pattern Pt1 is as follows: Pw=ExHi in the case of Tc≤T1, Pw=Hi in the case of T1<Tc≤T2, Pw=Mid in the case of T2<Pw≤T3, Pw=Lo in the case of T3<Tc≤T4, Pw=Mid in the case of T4<Tc≤T5, Pw=Hi in the case of T5<Tc≤T6, and Pw=ExHi in the case of T6<Tc. In a low-temperature region (<T3), a viscosity of the refrigerant increases, and thus the output of the electric pump 14 is increased.

A second pattern Pt2 is identical to the first pattern Pt1 in every temperature range except for Pw=Mid in the case of T1<Tc≤T4. According to a third pattern Pt3, Pw=ExHi in the case of Tc≤T1, Pw=Hi in the case of T1<Tc≤T6, and Pw=ExHi in the case of T6<Tc. According to a fourth pattern Pt4, Pw is equal to ExHi at all times regardless of the refrigerant temperature Tc.

In a short term, the cooler controller 52 switches the output of the electric pump 14 based on the refrigerant temperature Tc. In a long term, the cooler controller 52 adjusts the output of the electric pump 14 based on the temperature of the switching element. Specifically, the control patterns described above are switched in accordance with a magnitude of a heat stress that the switching element is subjected to in the long term. In an initial stage, the cooler controller 52 controls the electric pump 14 based on the first pattern Pt1. The "magnitude of the heat stress" is a cumulative amount of the heat stress that the switching element has been subjected to. Hereinafter, the "magnitude of the heat stress" that represents the cumulative amount of the heat stress will be simply referred to as the "heat stress".

As described above, the cooler controller 52 switches the output of the electric pump 14 in accordance with the heat stress that the switching element is subjected to. The heat stress will be described below. The hybrid car 2 repeats start and stop and repeats acceleration and deceleration. The switching element generates heat every time the hybrid car 2 starts and the hybrid car 2 accelerates. Then, the temperature of the switching element rises. The switching element is put into operation when the main battery 3 is charged with regenerative electric power, and the temperature of the switching element rises in this case. When the temperature rises, the switching element itself and surrounding components are subjected to thermal expansion. When the temperature falls, the switching element itself and the surrounding components are subjected to thermal contraction. During the repetition of the expansion and contraction, the switching element and the components around the switching element are subjected to damage and their performances are reduced. The damage that the switching element is subjected to due to the temperature change is referred to as the heat stress. In a case where grease is applied between a power card accommodating the switching element and the cooler, for example, the power card is repeatedly deformed and the grease is dissipated as a result of the expansion and contraction of the power card (switching element). Then, cooling characteristics deteriorate. In the case of an electric vehicle, behavior patterns of the switching elements, that is, time-dependent changes in temperature are diverse and speeds of accumulation of the heat stress that the switching elements are subjected to are diverse as well. An electric vehicle of a driver who prefers sudden acceleration and deceleration, in particular, is prone to more rapid heat stress accumulation than an electric vehicle of a driver who performs acceleration and deceleration in a gentle manner. A heat stress countermeasure can be scrupulously performed when the heat stress can be accurately estimated. For example, cooling power with respect to the switching element is enhanced when the heat stress is accumulated to a predetermined level. As another example, the heat stress that the switching element is subjected to is suppressed by the current that flows through the switching element being limited when the heat stress is accumulated to a predetermined level.

The hybrid car 2 is capable of estimating the heat stress that the switching elements 22, 23, 31 to 36 are subjected to. The hybrid car 2 estimates a relative magnitude of the heat stress that the switching elements 22, 23, 31 to 36 are subjected to with respect to the heat stress that can be allowed by the switching elements 22, 23, 31 to 36. A mechanism of the heat stress estimation will be described below. Considerations regarding notation will be described prior to the description. As described above, the PCU 5 is provided with the temperature sensor 45a that measures the temperatures of the switching elements 22, 23 and the temperature sensor 45b that measures the temperatures of the switching elements 31 to 36. The power controller 51 calculates a representative temperature of the plurality of switching elements 22, 23, 31 to 36 by appropriately using data of the two temperature sensors 45a, 45b. In the following description, the two temperature sensors 45a, 45b will be regarded as one imaginary temperature sensor for calculating the representative temperature of the switching elements, and this imaginary temperature sensor will be referred to as a "temperature sensor 45". In addition, the plurality of switching elements 22, 23, 31 to 36 will be simply referred to as the "switching element 22" and the representative temperature of the switching element 22 will be simply referred to as the "temperature of the switching element 22" for convenience of description. The estimation of the heat stress of the switching element 22 is performed mainly by the power controller 51, and thus the power controller 51 is a subject of the processing of the following description.

As described above, the heat stress depends on the change in the temperature of the switching element 22. A plurality of minimum points and maximum points are included in the time-dependent change in the temperature of the switching element 22, and the temperature change has a rising phase and a lowering phase. A temperature difference in the rising phase (temperature difference from the minimum point to the subsequent maximum point on the time series) and a temperature difference in the lowering phase (temperature difference from the maximum point to the subsequent minimum point on the time series) are not necessarily equal to each other. The power controller 51 calculates each of the temperature difference from the minimum point to the subsequent maximum point which are successive on a time axis and the temperature difference from the maximum point to the subsequent minimum point which are successive on the time axis in time-series data on the temperature of the switching element 22 so as to use results of the calculations in deriving an estimated value of the heat stress.

Figure 4:
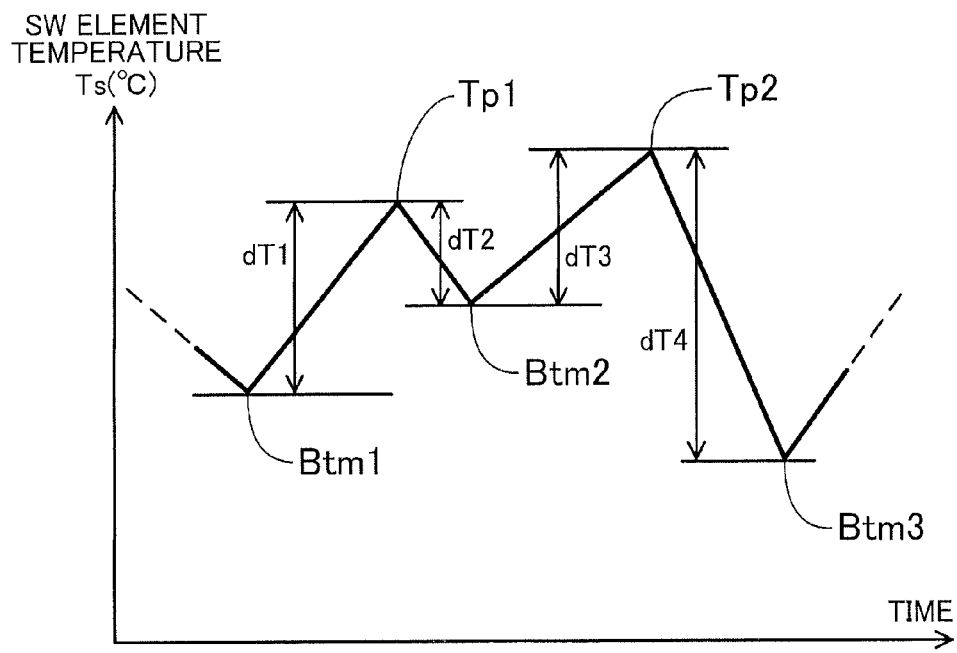
FIG. 4 is a graph illustrating an example of a switching element temperature change.

FIG. 4 shows an example of the switching element temperature change. The graph that is illustrated in FIG. 4 corresponds to the time-series data on the temperature of the switching element 22. The power controller 51 regularly acquires the temperature of the switching element 22 and stores the temperature of the switching element 22 as the time-series data. As illustrated in the example of FIG. 4, the temperature of the switching element 22 changes while repeatedly reaching the minimum points and the maximum points in an alternating manner. In the example of FIG. 4, a minimum point Btm1, a maximum point Tp1, a minimum point Btm2, a maximum point Tp2, and a minimum point Btm3 are present in chronological order. The power controller 51 extracts the maximum points and the minimum points from the stored time-series data on the switching element 22. Then, the power controller 51 calculates each of the temperature difference from the minimum point to the subsequent maximum point which are successive on the time axis and the temperature difference from the maximum point to the subsequent minimum point which are successive on the time axis with regard to the respective maximum and minimum points that are extracted. In the example of FIG. 4, the power controller 51 calculates a temperature difference dT1 between the minimum point Btm1 and the subsequent maximum point Tp1 that are adjacent to each other on the time axis, and then calculates a temperature difference dT2 between the maximum point Tp1 and the subsequent minimum point Btm2 that are adjacent to each other on the time axis. Likewise, the power controller 51 calculates a temperature difference dT3 between the minimum point Btm2 and the subsequent maximum point Tp2 that are adjacent to each other on the time axis, and then calculates a temperature difference dT4 between the maximum point Tp2 and the subsequent minimum point Btm3 that are adjacent to each other on the time axis. The power controller 51 has the final minimum point (or maximum point) on the time axis stored in the memory, and uses it as the initial minimum point (or maximum point) on the time axis during the next processing.

The power controller 51 creates a histogram with the calculated temperature differences. Accordingly, the power controller 51 has a region for storing the histogram secured in the memory 54. This region will be referred to as a counter memory 54 below. The histogram created by the power controller 51 is widths of bins defined by magnitudes of the temperature differences between the minimum points and the maximum points that are adjacent to each other on the time axis in the time-dependent change in the temperature of the switching element 22. In actuality, the counter memory 54 is a region that stores the number of occurrences of each of the bins in the histogram and is memory areas equal in number to the bins. Each of the memory areas corresponding to the respective bins stores an integer-value variable (counter) for counting the number of applications. The power controller 51 has reference values stored in advance with respect to the respective bins. On an assumption that the switching element 22 is repeatedly subjected to only the temperature difference pertaining to a specific one of the bins, the performance of the switching element 22 is estimated to undergo a significant reduction when the number of repetitions exceeds the reference value. In other words, the reference value is defined as the number of repetitions of a limit at which the switching element 22 can maintain its performance on the assumption that only the temperature difference of the bin corresponding to the reference value is repeatedly experienced. In this sense, the reference value provides an index of the heat stress regarding a capability of the switching element 22 to maintain its performance. The reference value can be thought of as a degradation index. The reference value (degradation index) is prepared for each of the bins. The reference value (degradation index) is defined in advance through a simulation and an experiment.

Figures 5, 6:
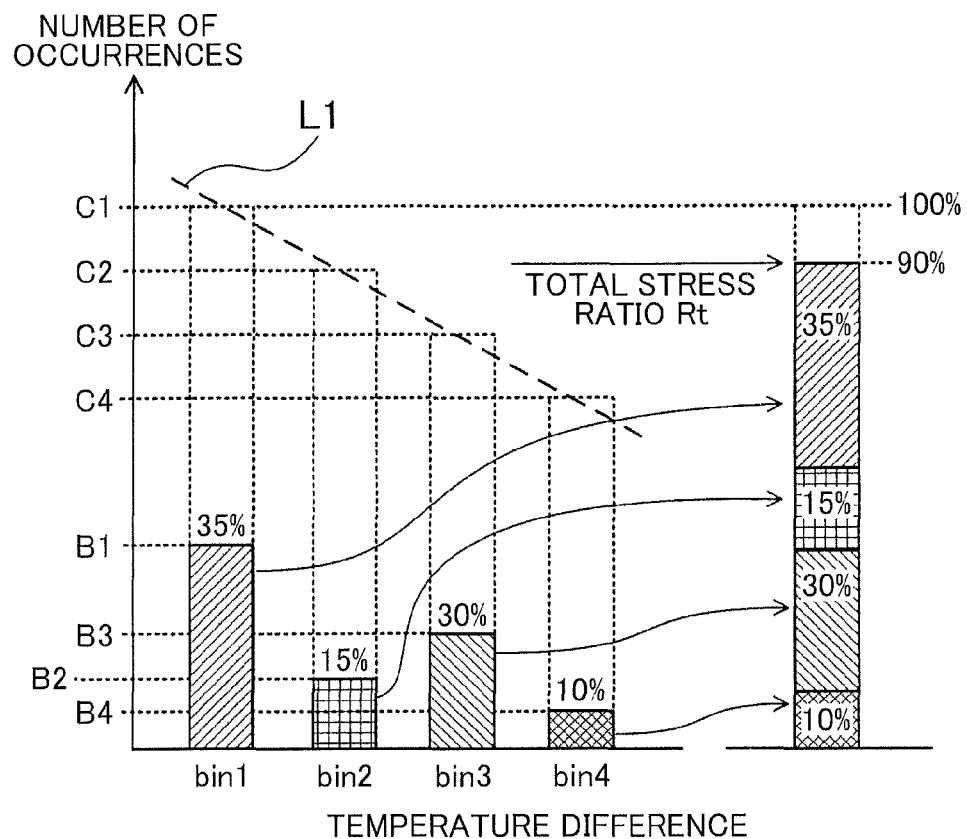
FIG. 5 is a table illustrating an example of a histogram.
FIG. 6 is a graph corresponding to the table in FIG. 5.

The power controller 51 increases the number of applications of the bin corresponding to each of the calculated temperature differences by one. In other words, the histogram that defines the widths of the bins by the magnitudes of the temperature differences is created by the use of the plurality of calculated temperature differences. FIG. 5 shows an example of the histogram. This histogram consists of four bins. In Bin 1, a range of the temperature difference dT is set to a range of $A1 \leq dT < A2$ and the reference value (degradation index) is C1. In Bin 2, the range of the temperature difference dT is set to a range of $A2 \leq dT < A3$ and the reference value is C2. In Bin 3, the range of the temperature difference dT is set to a range of $A3 \leq dT < A4$ and the reference value is C3. In Bin 4, the range of the temperature difference dT is set to a range of $A4 \leq dT < A5$ and the reference value is C4. In the example of FIG. 5, the number of occurrences of Bin 1 is B1, the number of occurrences of Bin 2 is B2, the number of occurrences of Bin 3 is B3, and the number of occurrences of Bin 4 is B4. FIG. 5 is merely an example, and the numbers and widths of the bins are appropriately determined. In this embodiment, an absolute value of a difference between a minimum-point temperature and a maximum-point temperature is adopted as the temperature, difference. Accordingly, for example, the temperature difference from a minimum-point temperature Tx to a maximum-point temperature Ty (Ty>Tx) in the rising phase and the temperature difference from the maximum-point temperature Ty to the minimum-point temperature Tx in the lowering phase are counted as the number of occurrences of the same bin insofar as the absolute values thereof are equal to each other. FIG. 4 shows only a part of the time-series data on the temperature, and the time-series data includes multiple maximum points and multiple minimum points.

FIG. 6 is FIG. 5 that is turned into a graph. A dashed line L1 is a line that connects the reference values Cn ("n" representing a bin number) of the respective bins. A horizontal axis of the graph represents the bins, that is, the temperature difference dT. The temperature difference dT increases from the left to the right on the horizontal axis. As is apparent from the dashed line L1 in FIG. 6, the reference value Cn decreases as the temperature difference dT increases. This is because the thermal expansion (or contraction) that occurs in the switching element 22 and the surrounding components intensifies as each temperature difference dT that the switching element 22 undergoes increases.

The magnitudes of the temperature differences between the minimum points and the maximum points are diverse, and the plurality of temperature differences dT that are extracted from the time-series data are spread to the plurality of bins as illustrated in FIG. 6. It is difficult to evaluate the heat stress that the switching element 22 is subjected to with the histogram as it is. In this regard, the power controller 51 organizes the information shown by the histogram (information showing a degree of the heat stress) into one index. This index is referred to as the total stress ratio Rt. A procedure for calculating the total stress ratio Rt will be described below.

The power controller 51 obtains a ratio of the number of occurrences Bn to the reference value Cn for each of the bins. This ratio is referred to as an individual stress ratio Rn of the bin n. The "n" in the "number of occurrences Bn", the "reference value Cn", the "bin n", and the "individual stress ratio Rn" represents the bin number throughout the following description.

The individual stress ratio Rn of the bin n is a value showing a ratio of the heat stress to which the switching element 22 is subjected to the heat stress that is allowed on the assumption that only the temperature change of the bin occurs in the switching element 22. The individual stress ratio Rn is obtained by dividing the number of occurrences Bn by the reference value Cn. In the example of FIG. 6, the individual stress ratios Rn of the respective bins are as follows: The individual stress ratio R1 of Bin 1 is 35% (=B1/C1), the individual stress ratio R2 of Bin 2 is 15% (=B2/C2), the individual stress ratio R3 of Bin 3 is 30% (=B3/C3), and the individual stress ratio R4 of Bin 4 is 10% (=B4/C4).

The power controller 51 adds the individual stress ratios Rn of all the bins to each other thereafter. A drawing that shows a schematic representation of the addition of the individual stress ratios Rn of all the bins is illustrated on the right-hand side of FIG. 6. A result of the addition corresponds to the total stress ratio Rt described above. The individual stress ratio Rn of each bin is a ratio of the heat stress attributable to the temperature difference dT corresponding to each bin to the allowed heat stress. Accordingly, the result of the addition of the individual stress ratios Rn of all the bins (the total stress ratio Rt) is a total heat stress that the switching element 22 is subjected to. The total stress ratio Rt shows the ratio of the heat stress to which the switching element 22 has been subjected to the heat stress that can be allowed by the switching element 22. The total stress ratio Rt is an estimated value of a relative magnitude of the heat stress that the switching element 22 is subjected to with respect to the heat stress that can be allowed by the switching element 22.

The above-described algorithm may be modified as follows. The individual stress ratio Rn of each bin is multiplied by the reference value C1 of Bin 1 such that a value pertaining to a case where the total stress ratio Rt is 100% corresponds to, for example, the reference value C1 of Bin 1. Then, the individual stress ratio R1 does not have to be calculated with regard to Bin 1, and a calculation load regarding the calculation of the total stress ratio Rt is reduced although the reduction might be slight. In other words, when a coefficient Dn (=C1/Cn) is defined for the bin n, a value that is obtained by adding the numbers of occurrences Bn of the respective bins n after multiplying each of the numbers of occurrences Bn of the respective bins n by the coefficient Dn becomes an index equivalent to the total stress ratio Rt. The "n" in the "coefficient Dn" also represents the bin number.

As described above, the reference value Cn is set to decrease as the temperature difference dT increases. This reflects that the thermal expansion (or contraction) which occurs in the switching element 22 and the surrounding components intensifies as each temperature difference dT that the switching element 22 undergoes increases. In other words, the reference value Cn is determined such that its contribution to the total stress ratio Rt of the temperature difference dT (estimated value of the heat stress) increases as the temperature difference dT increases.

The acquisition of the time-series data on the temperature of the switching element begins to be performed when the hybrid car 2 starts its first traveling. Meanwhile, updating of the histogram and the calculation of the total stress ratio Rt are performed at regular intervals. Examples of the regular interval include one month and one trip, and the latter means a period between ON and OFF of a main switch of the vehicle.

Figure 7:
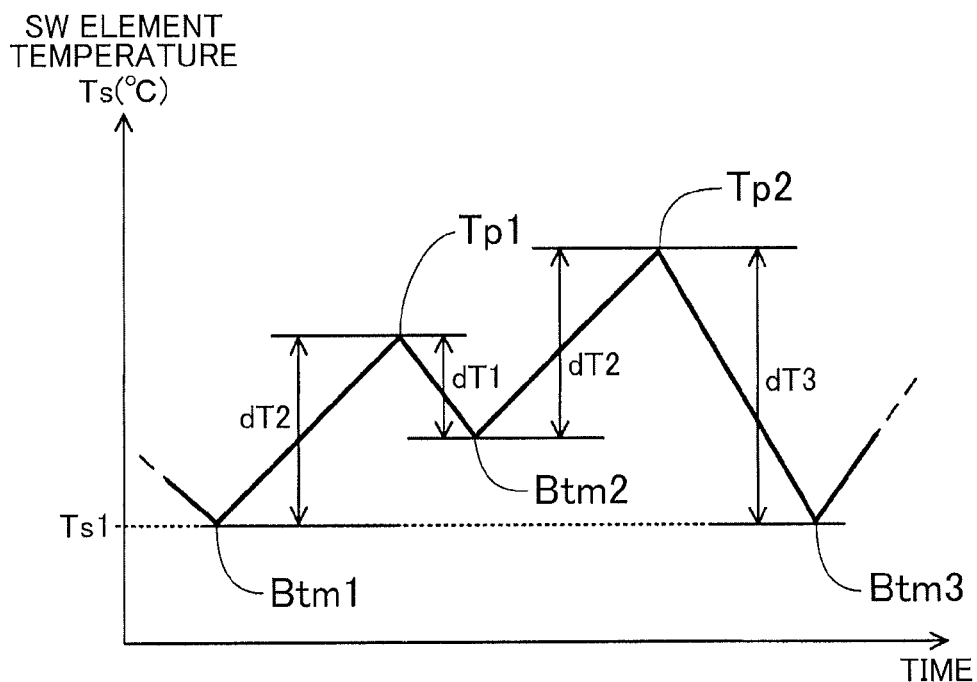
FIG. 7 is a graph illustrating another example of the temperature change.
Figure 8:
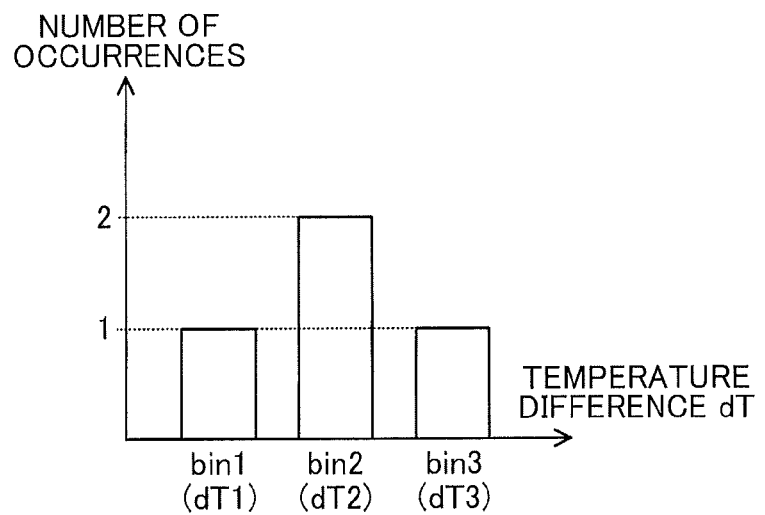
FIG. 8 is a histogram of the temperature change according to FIG. 7.

An advantage of individual handling of the temperature difference in the rising phase and the temperature difference in the lowering phase in the time-series data on the temperature change will be described below. FIG. 7 shows another example of the switching element temperature change. In the graph that is illustrated in FIG. 7, the minimum point Btm1 and the minimum point Btm3 have the same temperature Ts1. In FIG. 7, temperature difference signs dT1, dT2, dT3 are marked in an ascending order. A section from the minimum point Btm1 to the maximum point Tp1 is the rising phase with the temperature difference of dT2. A section from the maximum point Tp1 to the minimum point Btm2 is the lowering phase with the temperature difference of dT1. A section from the minimum point Btm2 to the maximum point Tp2 is the rising phase with the temperature difference of dT2 that is equal to the temperature difference of the section from the minimum point Btm1 to the maximum point Tp1. A section from the maximum point Tp2 to the minimum point Btm3 is the lowering phase with the temperature difference of dT3. FIG. 8 shows the temperature differences in FIG. 7 in the form of a histogram. For ease of understanding, the temperature differences dT1, dT2, dT3 are assigned to Bin 1, Bin 2, and Bin 3, respectively. As illustrated in FIG. 8, it can be expressed that the number of occurrences of Bin 1 is one, the number of occurrences of Bin 2 is two, and the number of occurrences of Bin 3 is one in the graph that is illustrated in FIG. 7. The histogram that is illustrated in FIG. 8 accurately represents the temperature change in the graph illustrated in FIG. 7.

The minimum point Btm1 to the minimum point Btm3 has to be counted as a single session if the graph illustrated in FIG. 7 is counted as a single session of a set of temperature rise and fall. Although two sessions of the set of temperature rise and fall are expressed in FIG. 7, the information is lost in that case. The graph illustrated in FIG. 7 is a fraction of the time-series data on the temperature, and the original time-series data includes multiple maximum points and multiple minimum points. The temperatures at the maximum points and the temperatures at the minimum points are diverse. Accordingly, a lot of information is lost if the graph illustrated in FIG. 7 is counted as a single session of a set of temperature rise and fall. In this embodiment, the temperature-rising phase and the temperature-lowering phase are individually counted, and thus the histogram can be obtained with the switching element temperature change accurately reflected therein. An accurate estimation result can be obtained when the heat stress of the switching element is estimated based on the histogram.

In the above description, the bins are divided with the absolute values of the temperature differences. In other words, the temperature difference in the temperature-rising phase and the temperature difference in the lowering phase are counted as the same bin when the temperature differences are equal to each other. However, the estimation of the heat stress becomes more accurate when the temperature difference in the rising phase and the temperature difference in the lowering phase are assigned to different bins when the temperature differences are equal to each other. An advantage thereof will be described with reference to FIGS. 9 to 11.

Figure 9:
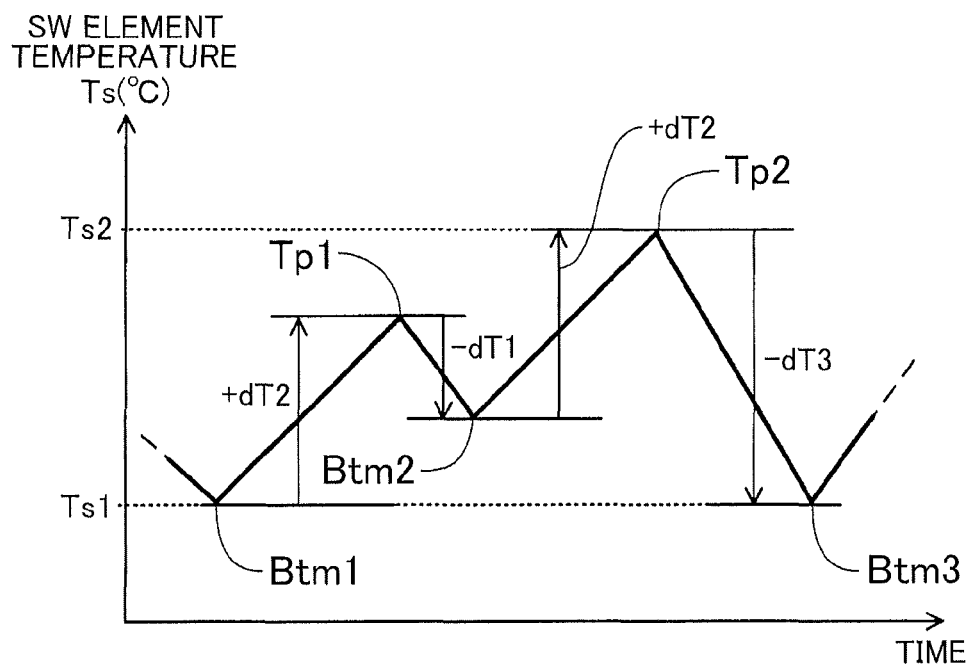
FIG. 9 is a graph illustrating yet another example of the temperature change (taking temperature difference signs into account)
Figure 10:
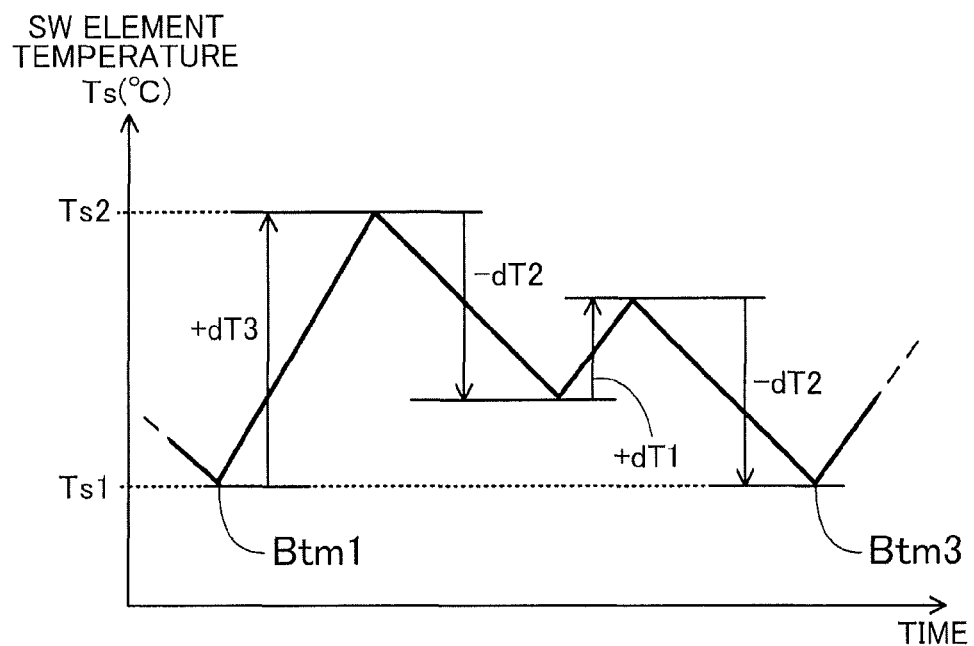
FIG. 10 is the graph of FIG. 9 that is laterally reversed.
Figure 11:
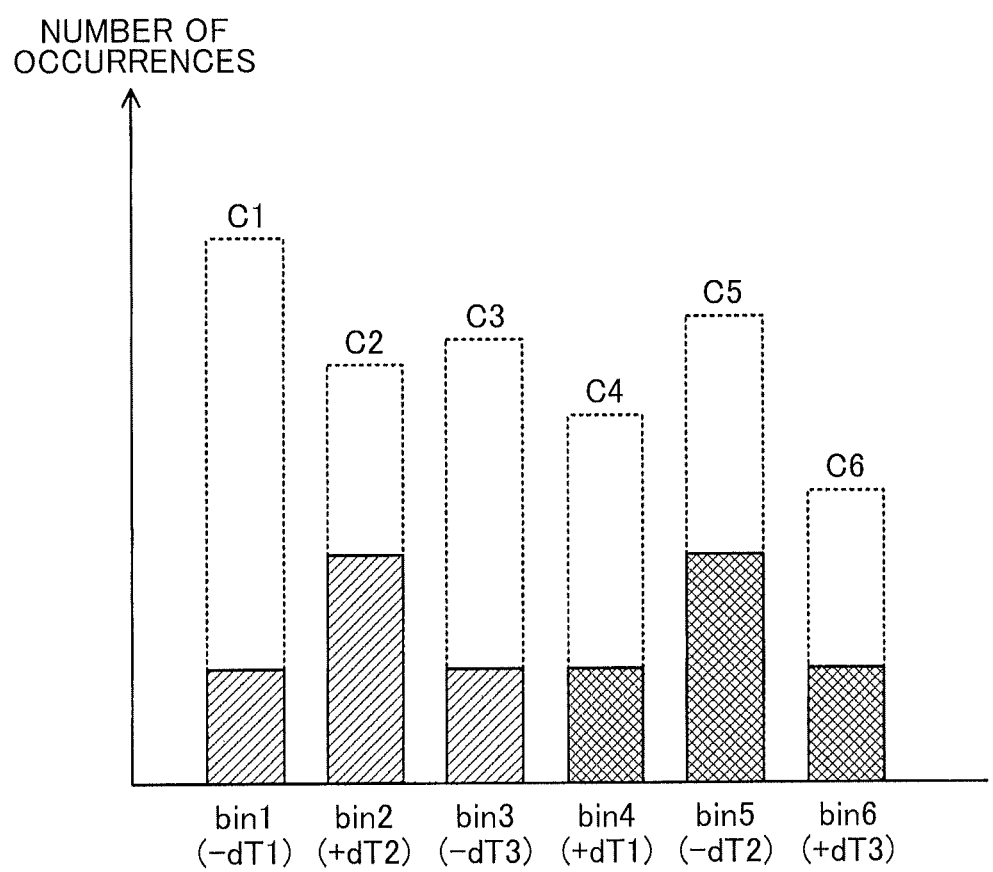
FIG. 11 is a histogram corresponding to the graphs of FIGS. 9 and 10.

FIG. 9 shows a graph of temperature change as is the case with FIG. 7. However, positive and negative signs are attached to the temperature differences in the graph illustrated in FIG. 9. In the graph illustrated in FIG. 9, the rising phase has two temperature differences (two +dT2s) and the lowering phase has two temperature differences (−dT1 and −dT3). The absolute values of the temperature differences increase in an order of dT1, dT2, and dT3. FIG. 10 is the graph of FIG. 9 that is laterally reversed. In the graph that is illustrated in FIG. 10, the rising phase has two temperature differences (+dT1 and +dT3) and the lowering phase has two temperature differences (two −dT2s). FIG. 11 shows the histograms of the respective graphs in FIGS. 9 and 10 summarized into one, in which Bin 1 to Bin 3 correspond to the histogram of the graph of FIG. 9 and Bin 4 to Bin 6 correspond to the histogram of the graph of FIG. 10. FIG. 11 also shows the reference value Cn of each bin. As in the above case, the performance of the switching element 22 is estimated to undergo a significant reduction when the number of repetitions (the number of occurrences Bn) exceeds the corresponding reference value Cn on the assumption that the switching element 22 is repeatedly subjected to the temperature difference pertaining to the specific bin n. Damage to the switching element attributable to the temperature difference in the rising phase outweighs damage to the switching element attributable to the temperature difference in the lowering phase. Accordingly, the reference value of the temperature difference in the rising phase with respect to the bin is lower than the reference value of the temperature difference in the lowering phase with respect to the bin. In FIG. 11, the reference values (C2, C4, C6) of the bins (Bins 2, 4, 6) corresponding to the temperature difference in the rising phase are lower than the reference values (C1, C3, C5) of the bins (Bins 1, 3, 5) corresponding to the temperature difference in the lowering phase. Then, the case of FIG. 9 and the case of FIG. 10 have different values obtained by the addition of the individual stress ratios Rn, that is, different total stress ratios Rt. Both of the graphs of FIGS. 9 and 10 start from the temperature Ts1, reach a maximum temperature Ts2, and then return back to the temperature Ts1. However, the values of the total stress ratios Rt differ from each other since the temperature difference in the rising phase and the temperature difference in the lowering phase are assigned to separate bins.

The graphs illustrated in FIGS. 9 and 10 are fractions of the time-series data on the temperature, and the original time-series data includes multiple maximum points and multiple minimum points. The temperature difference in the rising phase and the temperature difference in the lowering phase are diverse. Results might be significantly different when the temperature difference in the rising phase and the temperature difference in the lowering phase are not distinguished from each other. When the temperature difference in the rising phase and the temperature difference in the lowering phase are assigned to the separate bins and the reference value Cn is set for each bin n, the estimated value of the heat stress in which even an effect of a difference between the shapes of the graphs showing the switching element temperature change is taken into account can be obtained. When the above-described algorithm is adopted, the estimated value of the heat stress can be obtained with a higher level of accuracy.

The total stress ratio Rt (that is, the estimated value of the relative magnitude of the heat stress) has various applications. When the total stress ratio Rt reaches a predetermined determination value Jd, the hybrid car 2 changes the control pattern regarding the electric pump 14 and further cools the switching element 22. In other words, the hybrid car 2 increases the output of the electric pump 14 with respect to the refrigerant temperature to a higher level in a case where the total stress ratio Rt of the switching element 22 exceeds the predetermined determination value Jd than before the total stress ratio Rt exceeds the predetermined determination value Jd. After the increase in the total stress ratio Rt, the cooling system 11 is controlled so that the heat stress which is added to the switching element 22 is suppressed.

Figure 12:
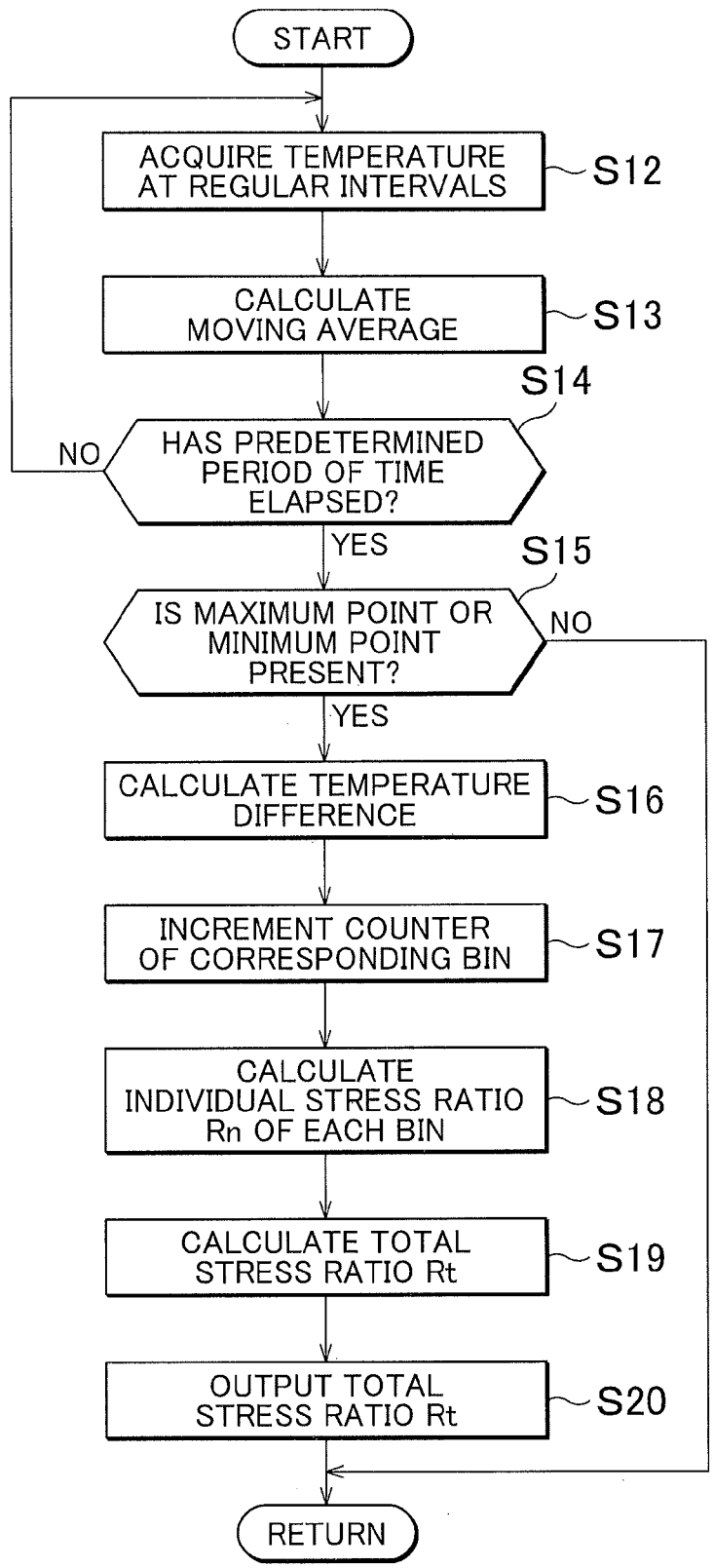
FIG. 12 is a flowchart of a processing for estimating a total stress ratio.

The procedure for obtaining the total stress ratio Rt will be described again with reference to the flowchart that is illustrated in FIG. 12. In addition, a procedure for switching the control pattern regarding the electric pump 14 will be described with reference to the flowchart that is illustrated in FIG. 13.

The power controller 51 acquires the temperature Ts of the switching element 22 at regular time intervals (S12). As described above, the power controller 51 acquires the temperature Ts of the switching element 22 from the temperature sensor 45. Then, the power controller 51 calculates a moving average of the temperatures Ts pertaining to past N times on the time axis (S13). This processing is to remove a high-frequency component (noise) from the time-series data on the temperature Ts of the switching element 22. In other words, the power controller 51 passes the time-series data on the temperature Ts of the switching element 22 through a low-pass filter. The moving average result will also be referred to as the "temperature Ts of the switching element 22" in the following description. The power controller 51 stores the time-series data on the temperature Ts of the switching element 22 after the low-pass filtering.

The power controller 51 keeps the time-series data on the temperature Ts of the switching element 22 for a predetermined period of time (S14: NO). Examples of the predetermined period of time may include one day and the period between ON and OFF of the main switch of the hybrid car 2. The predetermined period of time may have "hour" or a "traveling distance" as its unit.

After an elapse of the predetermined period of time (S14: YES), the power controller 51 extracts the maximum point and the minimum point from the stored time-series data (S15). This processing is terminated in a case where the maximum point or the minimum point is not extracted (S15: NO). Even in a case where only one maximum point or only one minimum point is extracted, processing subsequent to Step S16 can be executed by the use of the minimum point (or maximum point) stored during the previous processing according to FIG. 6 as described later. When a sufficiently long period of time is taken as the predetermined period of time relating to Step S14, a NO determination is not made in Step S15 in actuality.

In a case where the maximum point or the minimum point is extracted in Step S15, the power controller 51 calculates (extracts) each of the temperature difference dT from the minimum point to the subsequent maximum point that are successive on the time axis in the rising phase and the temperature difference dT from the maximum point to the subsequent minimum point that are successive on the time axis in the lowering phase in the stored time-series data (S16). In the example of FIG. 4, the temperature differences dT1, dT3 in the rising phase and the temperature differences dT2, dT4 in the lowering phase are calculated (extracted).

The final maximum point (or minimum point) on the time axis is stored in the memory. The stored maximum point (or minimum point) is taken into account in Step S15 of the next processing according to FIG. 6. In other words, at least one temperature difference is calculated (extracted) even in a case where only one maximum point or only one minimum point is extracted in Step S15 of the current processing. This is because the final maximum point (or minimum point) of the time-series data is stored in the previous processing and the temperature difference can be calculated with the previous maximum point (or minimum point) and the minimum point (or maximum point) extracted in the current processing.

Then, the power controller 51 increases the number of occurrences of the bin corresponding to the temperature difference, which is stored in the counter memory 54, by one for each of the calculated (extracted) temperature differences (S17). A value in the counter memory corresponding to each of the bins (that is, the current number of occurrences) is increased one by one, and thus can be referred to as a "counter". In this regard, the expression of the "counter" is used in Step S17 in FIG. 17. The power controller 51 allows the processing to proceed to the subsequent Step S18 after increasing the counter (the number of applications) stored in the counter memory 54 for all the calculated (extracted) temperature differences.

Then, the power controller 51 calculates the individual stress ratio Rn of each bin. Specifically, the power controller 51 calculates Rn (=Bn/Cn) for each of the bins (S18). Herein, "Bn" is the number of occurrences of the bin n and is the value of the counter stored in the counter memory 54 (refer to S17). Herein, "Cn" is the reference value that is set in advance with respect to the bin n. The power controller 51 adds the individual stress ratios Rn of the respective bins to each other and obtains the total stress ratio Rt thereafter (S19). The meanings of the individual stress ratio Rn and the total stress ratio Rt are as described above. Lastly, the power controller 51 outputs the total stress ratio Rt to the diagnosis memory 56 and the cooler controller 52 (S20). The cooler controller 52 controls the electric pump 14 based on the received total stress ratio Rt. During maintenance of the hybrid car 2, the total stress ratio Rt that is stored in the diagnosis memory 56 is utilized by service staff.

The processing that is illustrated in FIG. 12 is initiated when the hybrid car 2 is provided for use by a user and is repeatedly executed. The counter memory 54 is updated and a new total stress ratio Rt is output every time the processing illustrated in FIG. 12 is executed. In other words, the histogram showing the temperature difference of the switching element 22 is regularly updated.

As described above, the hybrid car 2 changes the control pattern regarding the electric pump 14 of the cooling system 11 when the total stress ratio Rt exceeds the predetermined determination value Jd. This processing is executed by the cooler controller 52. A flowchart of the control pattern switching processing that is executed by the cooler controller 52 is illustrated in FIG. 13. The cooler controller 52 receives the total stress ratio Rt from the power controller 51 (Step S23). The cooler controller 52 compares the received total stress ratio Rt to the determination value Jd that is stored in advance. The determination value Jd shows a determination reference regarding an increase in the cooling power with respect to the switching element so that the subsequent heat stress of the switching element 22 is to be suppressed. The determination value Jd is determined in advance based on a simulation, characteristics of the switching element, and the like. The determination value Jd is set to, for example, 90%. This means that the cooler controller 52 enhances the cooling power with respect to the switching element 22 when the heat stress to which the switching element 22 is subjected exceeds 90% of the allowable stress amount.

In a case where the total stress ratio Rt exceeds the determination value Jd (S24: YES), the cooler controller 52 switches the control pattern regarding the electric pump 14 from the first pattern Pt1 to the second pattern Pt2 (S25). As described above, the pump output that is set in the temperature range of T3≤refrigerant temperature Tc<T4 is set to be higher in the second pattern Pt2 than in the first pattern Pt1. In other words, the cooling power with respect to the switching element 22 is enhanced when the control pattern is switched to the second pattern Pt2. More specifically, the cooler controller 52 increases the output of the electric pump 14 with respect to the temperature range of T3≤refrigerant temperature Tc<T4 to a higher level in a case where the total stress ratio Rt exceeds the determination value Jd than before the total stress ratio Rt exceeds the determination value Jd. In this manner, the hybrid car 2 enhances the cooling power with respect to the switching element 22 when the total stress ratio Rt of the switching element 22 exceeds the predetermined determination value Jd, and then relaxes the heat stress that the switching element 22 is subjected to.

The flowchart that is illustrated in FIG. 13 has only one determination value Jd. However, the cooler controller 52 may sequentially switch the control pattern regarding the electric pump 14 as the total stress ratio Rt increases with a plurality of determination values prepared.

Figure 14:
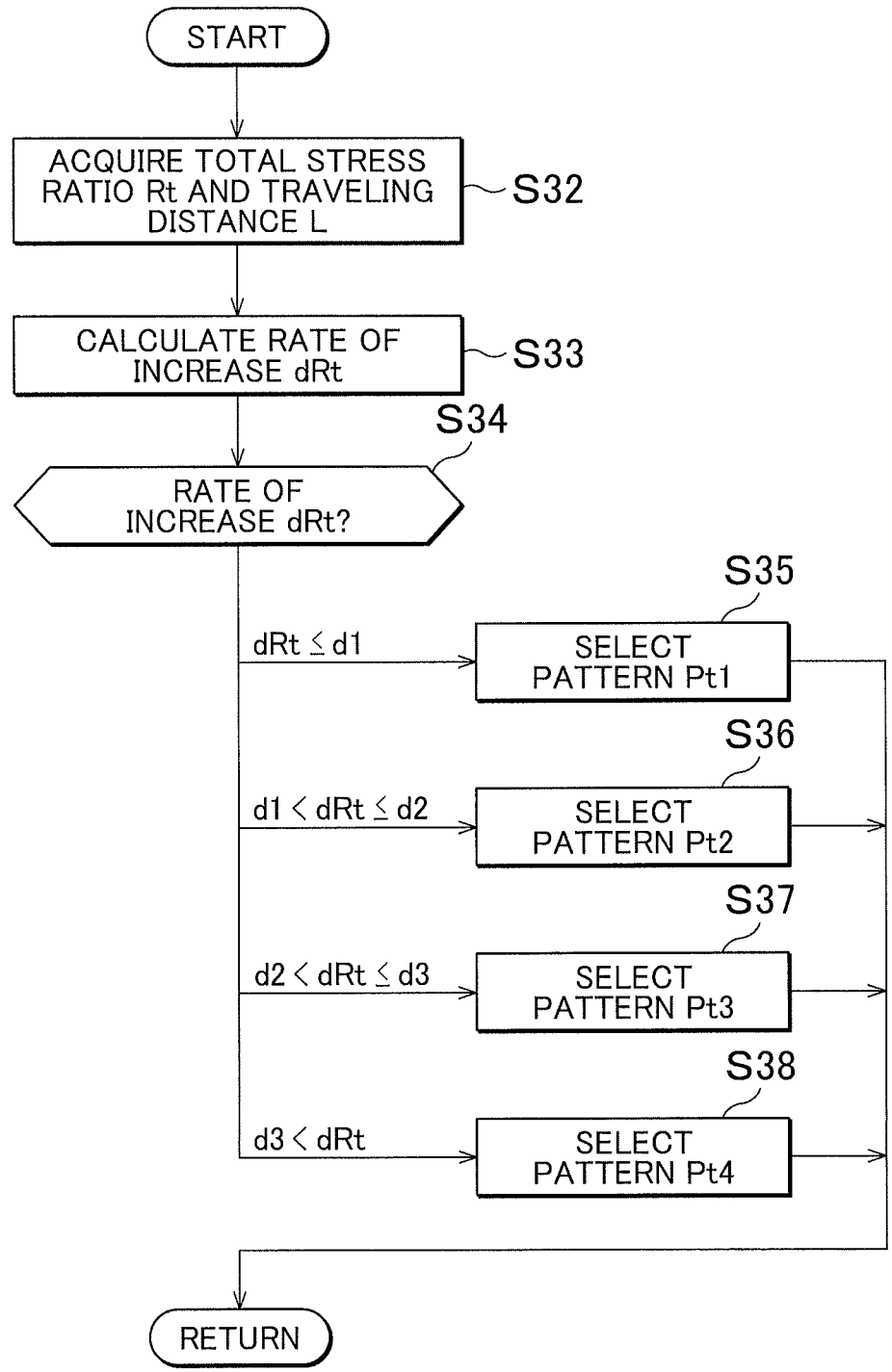
FIG. 14 is a flowchart of another example of the processing for the electric pump control switching using the total stress ratio.

Another example (modification example) of the electric pump control based on the total stress ratio Rt will be described below. FIG. 14 is a flowchart of another pump control switching processing that is executed by the cooler controller 52. In this modification example, the power controller 51 updates the total stress ratio Rt for each trip and outputs the updated total stress ratio Rt to the cooler controller 52. Herein, one trip refers to the traveling distance corresponding to the period between ON and OFF of the main switch of the hybrid car 2. In addition, the power controller 51 acquires the traveling distance L of the trip in which the total stress ratio Rt is updated from the HV controller 53 and sends the traveling distance L to the cooler controller 52. The cooler controller 52 receives the total stress ratio Rt and the traveling distance L from the power controller 51 (S32). The cooler controller 52 stores the total stress ratio Rt that is received each time. The cooler controller 52 subtracts the total stress ratio Rt of the previous trip from the currently-received total stress ratio Rt, sRt, which is a result of the subtraction (=current Rt−previous Rt), corresponds to an increment in the total stress ratio pertaining to the current trip. The cooler controller 52 divides the total stress ratio increment sRt pertaining to the current trip by the traveling distance L of the current trip. sRt/L (=dRt) represents a rate of increase per unit traveling distance in the total stress ratio pertaining to the current trip. In other words, the cooler controller 52 calculates the rate of increase dRt in the total stress ratio pertaining to the current trip (S33).

The cooler controller 52 switches the control pattern regarding the electric pump 14 in accordance with a magnitude of the rate of increase dRt (S34). In the case of rate of increase dRt≤first determination value d1, the cooler controller 52 selects the first pattern Pt1 as the control pattern regarding the electric pump 14 (S35). In the case of first determination value d1<rate of increase dRt≤second determination value d2, the cooler controller 52 selects the second pattern Pt2 (S36). In the case of second determination value d2<rate of increase dRt≤third determination value d3, the cooler controller 52 selects the third pattern Pt3 (S37). In the case of third determination value d3<rate of increase dRt, the cooler controller 52 selects the fourth pattern Pt4 (S38). In the range of T3≤Tc<T4, the output of the electric pump 14 increases in an order of first pattern Pt1<second pattern Pt2<third pattern<fourth pattern as illustrated in FIG. 3. In other words, the cooler controller 52 increases the output of the pump with respect to the refrigerant temperature as the rate of increase dRt in the total stress ratio Rt with respect to the unit traveling distance increases.

In this modification example, the output of the electric pump 14 increases and the cooling power with respect to the switching element 22 increases as the rate of increase dRt in the total stress ratio with respect to the unit traveling distance increases. Accordingly, the cooling power with respect to the switching element increases as the total stress ratio Rt quickly increases, and the subsequent rate of increase in the total stress ratio of the switching element 22 is suppressed. The rate of increase dRt in the total stress ratio depends on manners in which the hybrid car is operated. In the hybrid car according to this modification example, a cooling capacity with respect to the switching element increases as the total stress ratio Rt of the switching element quickly increases depending on the driver's characteristics. In contrast, in this modification example, the cooling capacity with respect to the switching element is suppressed at a lower level as the rate of increase in the total stress ratio Rt of the switching element decreases. The more the output of the electric pump 14 is suppressed, the higher fuel economy of the hybrid car becomes. In this modification example, saving of energy is promoted, concerning the points including electric power consumption by the electric pump 14, as the driving is performed with gentle acceleration and deceleration.

Considerations regarding the technique described in the first embodiment will be described. In the hybrid car according to the embodiment, the total stress ratio Rt is calculated in real time and is used for controlling the electric pump 14. The hybrid car 2 has the time-series data on the temperature of the switching element stored in the diagnosis memory 56, and the staff may acquire the time-series data during the maintenance for the execution of the processing of FIG. 12. In other words, the technique that is disclosed in this specification can also be used as a method for estimating the heat stress of the switching element. This method is illustrated in FIG. 12 in the form of a flowchart. The heat stress estimation method includes the following procedures: (1) Specifying the maximum point and the minimum point from the time-series data on the temperature of the switching element (Step S15 in FIG. 12), (2) Calculating each of the temperature difference from the minimum point to the subsequent maximum point that are successive on the time axis and the temperature difference from the maximum point to the subsequent minimum point that are successive on the time axis (Step S16 in FIG. 12), (3) Increasing the counter (the number of occurrences) of the bin corresponding to the temperature difference, which is stored in the counter memory 54, by one for each of the calculated temperature differences (Step S17 in FIG. 12), the counter memory 54 being a memory that stores the number of occurrences of each bin in the histogram in which the widths of the bins are defined by the magnitudes of the temperature differences between the minimum points and the maximum points in the time-dependent change in the temperature of the switching element, (4) Obtaining the ratio (the individual stress ratio Rn) with respect to the reference value of the stored counter (the number of occurrences) for each of the bins (Step S18 in FIG. 12), and (5) Adding the individual stress ratios Rn of all the bins and outputting the value obtained by the addition (the total stress ratio Rt) (Steps S19, S20 in FIG. 12). The total stress ratio Rt represents the relative magnitude of the heat stress that the switching element 22 is subjected to with respect to the heat stress that can be allowed by the switching element 22. In other words, the total stress ratio Rt is the estimated value of the heat stress of the switching element 22. Again, the "switching element 22" means all the switching elements 22, 23, 31 to 36 that the PCU 5 includes.

Several characteristics of the technique described in the first embodiment will be enumerated below. This specification discloses a technique for estimating the past heat stress that the switching element has been subjected to. More specifically, this specification discloses a technique for quantitatively estimating a cumulative value of the past heat stress that the switching element has been subjected to. One of the characteristics consists in the use of the histogram during the heat stress estimation. The power controller 51 is provided with the counter memory 54 that stores the number of occurrences of each bin in the histogram in which the widths of the bins are defined by the magnitudes of the temperature differences between the minimum points and the maximum points in the time-dependent change in the temperature of the switching element. This power controller 51 calculates the estimated value of the heat stress by the use of the counter memory 54 and the above-described processing.

Another one of the characteristics consists in the method for calculating the estimated value based on the number of applications in the histogram. The power controller 51 stores the reference value Cn of the number of occurrences with respect to each of the bins in the histogram. The power controller 51 obtains the ratio (the individual stress ratio Rn) with respect to the stored reference value of the number of occurrences Bn with regard to each of the bins. The power controller 51 adds the ratios (the individual stress ratios Rn) of all the bins to each other, and outputs the value obtained by the addition as the estimated value of the heat stress (the total stress ratio Rt).

The histogram is a distribution of the numbers of occurrences. Accordingly, it is difficult to use the histogram as it is as a heat stress evaluation index. The above-described method, however, is easy to use because the information in the histogram is expressed as a scalar value. The estimated value (the total stress ratio Rt) has the following application in a case where, for example, the electric vehicle is provided with a refrigerant circulation path (the cooling pipe 13) for cooling the switching element and the pump (the electric pump 14) for refrigerant circulation. In a case where the obtained estimated value exceeds the predetermined determination value Jd, the cooler controller 52 increases the output of the pump (the electric pump 14) with respect to a predetermined refrigerant temperature to a higher level than before the estimated value (the total stress ratio Rt) exceeds the determination value Jd. Alternatively, the cooler controller 52 increases the output of the pump with respect to the predetermined refrigerant temperature as the rate of increase (dRt) per unit time or the rate of increase per unit traveling distance in the estimated value (the total stress ratio Rt) increases. When the cooling power with respect to the switching element is enhanced once the heat stress of the switching element is accumulated to a predetermined magnitude as described above, the subsequent heat stress of the switching element can be relaxed.

Still another one of the characteristics of the technique according to the embodiment consists in setting the reference value Cn for each of the bins and deriving the total stress ratio Rt by the use of the reference values Cn. According to the embodiment, the performance of the switching element 22 is estimated to undergo a significant reduction when the number of repetitions exceeds the reference value Cn corresponding to the specific bin while the switching element 22 is repeatedly subjected to the temperature difference pertaining to the specific bin. The bins have different reference values Cn. Accordingly, even when the reference values are defined for the respective bins, a total amount of the heat stress that the switching element 22 is subjected to cannot be found with the histogram as it is. The individual stress ratio Rn described above can be regarded as the ratio of the heat stress to which the switching element 22 has been subjected to the heat stress that can be allowed by the switching element 22 on the assumption that only the temperature difference of the bin is repeatedly experienced. The total stress ratio Rt, which is the value obtained by the addition of the individual stress ratios Rn, corresponds to the relative magnitude of the heat stress to which the switching element 22 is subjected to the heat stress that can be allowed by the switching element 22. In other words, the total stress ratio Rt clearly shows the ratio of the heat stress to which the switching element 22 is subjected to the heat stress that can be allowed. The reference value Cn is determined in advance through an experiment, a simulation, and the like.

Still another one of the characteristics of the technique according to the embodiment consists in that each of the temperature difference in the rising phase and, the temperature difference in the lowering phase in the time-series data on the temperature change is extracted and reflected in the histogram. The bins in the histogram and the reference values Cn may have the following aspects so that the use of the extraction of each of the temperature difference in the rising phase and the temperature difference in the lowering phase becomes more effective. The temperature difference in the rising phase directed toward the maximum point from the minimum point on the time axis and the temperature difference in the lowering phase directed toward the minimum point from the maximum point on the time axis, which are temperature differences that have the same absolute value, are assigned to different bins. Then, the respective reference values Cn of the different bins are differentiated. At the same temperature difference, the heat stress (damage) that the element is subjected to is larger in a case where the temperature of the switching element is on the rise than in a case where the temperature of the switching element is on the decline. Accordingly, regarding the bins assigned to the temperature differences that have the same absolute value, the reference value Cn of the bin corresponding to the temperature difference in the rising phase is lower than the reference value Cn of the bin corresponding to the temperature difference in the lowering phase. As described above, the performance of the switching element 22 is estimated to undergo a significant reduction when the number of repetitions exceeds the reference value Cn corresponding to the specific bin while the switching element 22 is repeatedly subjected to the temperature difference pertaining to the specific bin. A low reference value Cn signifies quick damage accumulation from few temperature difference repetitions. The heat stress that the switching element is subjected to can be more accurately estimated when a difference in the heat stress (damage) between the rising phase and the lowering phase is reflected. The "temperature difference in the rising phase" is paraphrased as the "temperature difference during a rise in temperature" and the "temperature difference in the lowering phase" is paraphrased as the "temperature difference during a drop in temperature".

The modification example uses the rate of increase dRt per unit traveling distance in the total stress ratio. However, an increment per unit time may be adopted instead of the unit traveling distance. In the embodiment, the power controller 51 executes the calculation and output of the total stress ratio Rt and the cooler controller 52 executes the control of the cooling system 11 using the total stress ratio Rt. These processing (algorithms) may be executed by any one of the controllers. When the power controller 51, the cooler controller 52, and the HV controller 53 are collectively referred to as a "computer 50", all the processing described in the above-described embodiment are executed by the computer 50. In other words, the computer 50 corresponds to a computer that the PCU 5 is provided with. The hybrid car 2 may wirelessly transmit the switching element temperature data to an information center, and the computer installed in the information center may execute the above-described processing. In other words, the processing described in the above-described embodiment may be executed by the computer disposed outside the vehicle.

Figure 15:
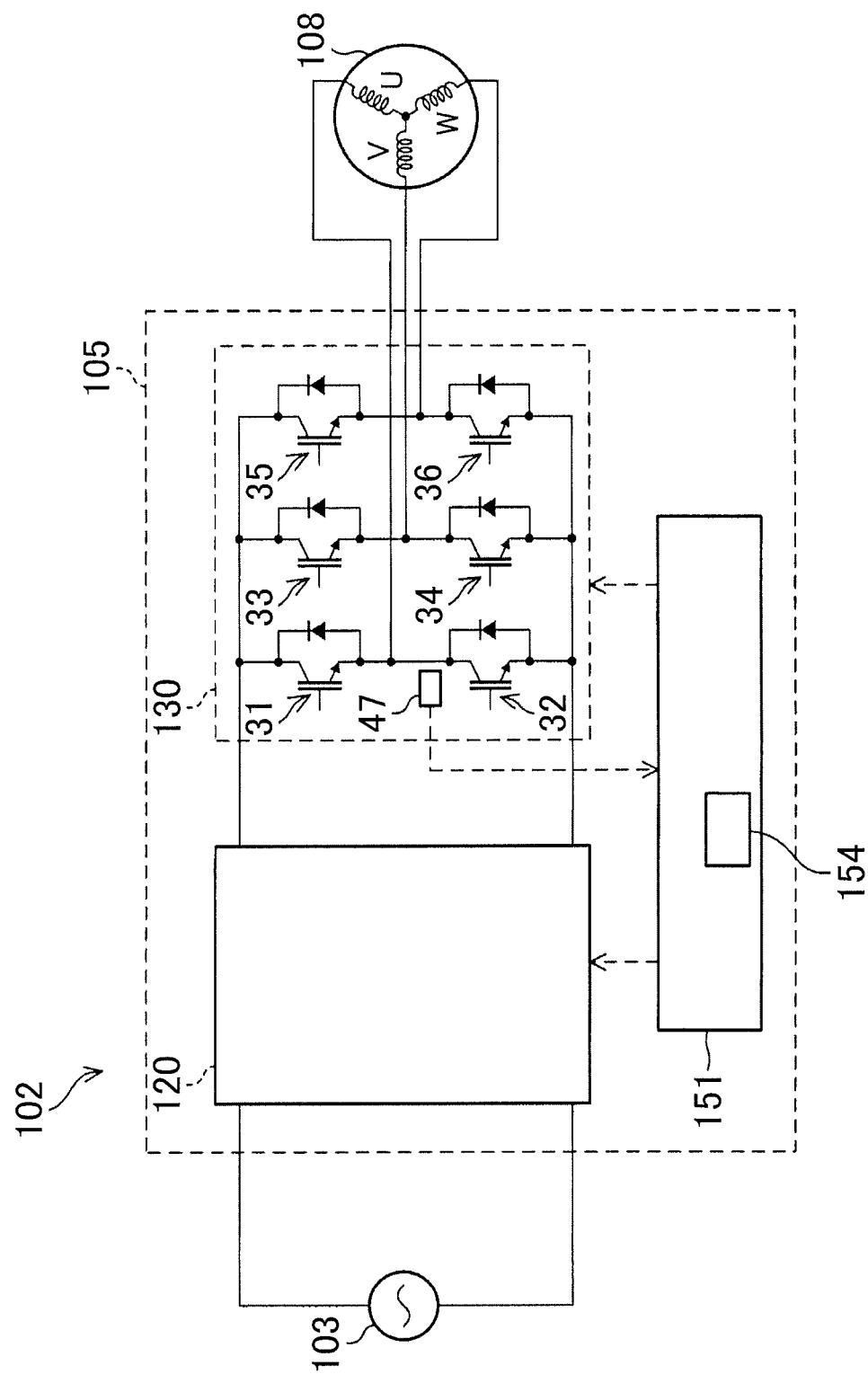
FIG. 15 is a block diagram of a robot including a motor controller according to a second embodiment.

Hereinafter, a second embodiment will be described. A motor controller according to the second embodiment drives a joint motor of a robot 102. FIG. 15 is a block diagram illustrating the robot 102 including the motor controller 105. The robot 102 is provided with the motor controller 105 and the joint motor 108. Although the robot 102 is provided with a plurality of the joint motors and the motor controller 105 is provided with as many inverters as the joint motors, only one joint motor 108 and only one inverter 130 are illustrated in FIG. 15. The motor controller 105 is a device that converts electric power from a commercial alternating-current power supply 103 into electric power suitable for the driving of the joint motor 108. The motor controller 105 is provided with an AC-DC converter 120, the inverter 130, and a computer 151. The AC-DC converter 120 converts alternating-current electric power from the commercial alternating-current power supply 103 into direct-current electric power. Detailed description of the AC-DC converter 120 will be omitted. The inverter 130 has the same circuit configuration as the inverter 30 according to the first embodiment. In other words, the inverter 130 is provided with the six switching elements 31 to 36, and three sets of series circuits each having two of the switching elements are connected in parallel. The inverter 130 is provided with a temperature sensor 47 that measures the temperatures of the switching elements 31 to 36. The temperature sensor 47 is provided in an area where the six switching elements 31 to 36 are integrated, and measures a temperature of the entire area. The temperature that is measured by the temperature sensor 47 is handled as an average temperature of the six switching elements 31 to 36. The computer 151 sends a PWM signal to each of the switching elements and outputs an estimated value of the heat stress of the switching element to the a memory 154 based on the temperature that is measured by the temperature sensor 47.

A heat stress estimation processing that is executed by the computer 151 will be described below. The computer 151 regularly acquires the measured temperature from the temperature sensor 47 and accumulates time-series data on the temperature of the switching element. The time-series data on the temperature represents a time-dependent change in the temperature. After the accumulation of the time-series data for a certain period of time, the computer 151 extracts the maximum point and the minimum point of the temperature from the time-series data on the temperature. The computer calculates the temperature difference from the minimum point to the subsequent maximum point that are adjacent to each other on the time axis (temperature difference in the temperature-rising phase) and the temperature difference from the maximum point to the subsequent minimum point that are adjacent to each other on the time axis (temperature difference in the temperature-lowering phase) for each extracted maximum value and minimum value. The computer 151 calculates an estimated value Re of the heat stress by using the following (Mathematical Formula 1).

$$Re = \sum_{i=N} (dT(i) \times D)$$ (Mathematical Formula 1)

In (Mathematical Formula 1), N represents the number of the extracted temperature differences dT and dT(i) represents the ith temperature difference. dT(i) includes both the temperature difference in the rising phase and the temperature difference in the lowering phase. In addition, dT(i) shows the absolute value of the temperature difference. In other words, dT(i) is a positive value. This is because the (cumulative amount of the) heat stress does not decrease. "D" is a weighting factor that is determined in advance. Several values can be taken, depending on the magnitude of the temperature difference dT, as the weighting factor. Since the weighting factor D changes depending on the temperature difference dT, the weighting factor D is within the parentheses of the summation processing. FIG. 16 shows an example of the weighting factor. The weighting factor D is as follows. The weighting factor D is 1.0 when the temperature difference dT is less than a temperature E1. The weighting factor D is 1.5 when the temperature difference dT is at least the temperature E1 and is less than E2. The weighting factor D is 2.0 when the temperature difference dT is at least the temperature E2 and is less than E3. The weighting factor D is 2.5 when the temperature difference dT is at least the temperature E3. In other words, the value of the weighting factor D is set to increase as the absolute value of the temperature difference dT increases. (Mathematical Formula 1) shows that the estimated value Re of the heat stress is a value obtained by accumulating the calculated temperature differences each multiplied by the predetermined weighting factor D. An increase in the damage to the switching element that occurs as one temperature difference increases is reflected in the value of the weighting factor D which is set to increase as the temperature difference dT increases.

The computer 151 outputs, as the estimated value, the value obtained by accumulating the calculated temperature differences each multiplied by the predetermined weighting factor D. The value of the weighting factor D is set to increase as the absolute value of the temperature difference increases. In other words, the weighting factor D is set such that its contribution to the estimated value of the heat stress increases as the temperature difference increases.

The computer 151 regularly executes (Formula 1) and calculates the estimated value of the heat stress that the switching element is subjected to. The computer 151 stores the calculated estimated value Re in the memory 154. The estimated value Re that is stored in the memory is utilized during maintenance of the motor controller 105.

The weighting factor D may have diverse variations. The simplest one of the variations is the weighting factor D being 1.0 at all times. In other words, a simple integrated value of the absolute value of the temperature difference between the maximum value and the minimum value may be the estimated value Re of the heat stress. Even in this case, the estimated value Re increases as the temperature difference increases. In other words, the contribution of the temperature difference to the estimated value of the heat stress increases as the value of the temperature difference increases.

It is also preferable that the weighting factor D is corrected in accordance with the length of time between the maximum point and the minimum point for calculating the temperature difference. In addition, it is also preferable that the weighting factor D is corrected in accordance with the temperature at the maximum value or the temperature at the minimum value. In addition, the temperature difference dT is an absolute value in the second embodiment, and thus weighting factors of the same magnitude are applied insofar as the absolute value of the temperature difference from the minimum point to the subsequent maximum point of the temperature is equal to the absolute value of the temperature difference from the maximum point to the subsequent minimum point of the temperature. Although the absolute value is used in the temperature difference, the weighting factor with respect to the temperature difference from the minimum point to the subsequent maximum point may differ from the weighting factor with respect to the temperature difference from the maximum point to the subsequent minimum point. In this case, it is desirable that the former weighting factor (from the minimum point to the maximum point) exceeds the latter weighting factor (from the maximum point to the minimum point). This is because the damage that the switching element is subjected to in the temperature-rising phase exceeds the damage that the switching element is subjected to in the temperature-lowering phase.

Other considerations relating to the embodiments will be described below. The computer of the motor controller extracts the maximum point and the minimum point in the time-dependent change in the temperature of the switching element, calculates the temperature difference from the maximum point to the subsequent minimum point and the temperature difference from the minimum point to the subsequent maximum point, and calculates the estimated value of the heat stress that the switching element is subjected to based on each of the calculated temperature differences. The computer may calculate the temperature difference between the maximum point and the minimum value immediately preceding the maximum point on the time-series data on the temperature and the temperature difference between the minimum point and the maximum point immediately preceding the minimum point on the time-series data on the temperature. The calculation of the temperature difference from the maximum point to the subsequent minimum point and the calculation of the temperature difference between the minimum point and the maximum point immediately preceding the minimum point are identical to each other in substance.

The hybrid car 2 has been used as an example in the description of the first embodiment. However, the technique that is disclosed in this specification can be applied to, for example, a motor controller of an electric car which is provided with a traveling motor and no engine as well as the hybrid car. The technique that is disclosed in this specification can be applied to a fuel cell vehicle, too. The cooling pipe 13 according to the embodiment corresponds to an example of the refrigerant circulation path. The motor controller for a robot has been used as an example in the description of the second embodiment. However, the motor controller that is disclosed in this specification can also be applied to those other than the electric vehicle and the robot.

Specific examples of the invention have been described in detail above. However, the examples are only for exemplary purposes, and do not limit the scope of claims. The technique according to the scope of claims also includes various modifications and alterations to the specific examples described above. The technical elements described in this specification or the drawings attain technical utility when combined in various manners or by themselves, and are not limited to the combinations described in the filed claims. The technique described in this specification or the drawings is capable of achieving multiple purposes at the same time, and retains its technical utility even when only one of the purposes is achieved.

What is claimed is:

1. A motor controller comprising:
a switching element configured to convert output electric power of an electric power supply into motor-driving electric power;
a temperature sensor configured to measure a temperature of the switching element; and
a computer configured to extract a maximum point and a minimum point in a time-dependent change in the temperature of the switching element, the computer being configured to calculate a temperature difference between the maximum point and the minimum point adjacent to each other and being configured to calculate an estimated value of a heat stress to which the switching element is subjected based on each calculated temperature difference,
wherein the computer includes a counter memory storing the number of occurrences of each bin in a histogram,
wherein a width of the bin is defined by a magnitude of the temperature difference,
wherein the computer is configured to increase the number of occurrences of the bin corresponding to each of the temperature differences stored in the counter memory by one for each of the calculated temperature differences, and
wherein the computer is configured to calculate the estimated value based on the number of occurrences of the bin stored in the counter memory.

2. The motor controller according to claim 1,
wherein the computer is configured such that a contribution of the temperature difference to the estimated value increases as the temperature difference increases.

3. The motor controller according to claim 1,
wherein the computer is configured to store a reference value of the number of occurrences with respect to each of the bins in the histogram, and
wherein the computer is configured to obtain a ratio of the stored number of occurrences to the reference value for each of the bins, add the ratios of all the bins to each other, and output a value obtained by adding the ratios as the estimated value.

4. The motor controller according to claim 3,
wherein the computer is configured to assign the temperature difference in a rising phase directed toward the maximum point from the minimum point on a time axis and the temperature difference in a lowering phase directed toward the minimum point from the maximum point on the time axis, the temperature differences being temperature differences having the same absolute value, to different bins, and
wherein different values are set as the reference values for the respective different bins.

5. A vehicle comprising:
a traveling motor;
a refrigerant circulation path configured to cool a switching element;
a pump configured to circulate a refrigerant; and
a motor controller including:
a switching element configured to convert output electric power of an electric power supply into motor-driving electric power;
a temperature sensor configured to measure a temperature of the switching element; and
a computer configured to extract a maximum point and a minimum point in a time-dependent change in the temperature of the switching element, the computer being configured to calculate a temperature difference between the maximum point and the minimum point adjacent to each other and being configured to calculate an estimated value of a heat stress to which the switching element is subjected based on each calculated temperature difference and the computer being configured to increase an output of the pump with respect to a predetermined refrigerant temperature to a higher level in a case where the estimated value exceeds a predetermined determination value than before the estimated value exceeds the determination value.

6. A vehicle comprising:
a traveling motor;
a refrigerant circulation path configured to cool a switching element;
a pump configured to circulate a refrigerant; and
a motor controller including:
a switching element configured to convert output electric power of an electric power supply into motor-driving electric power;
a temperature sensor configured to measure a temperature of the switching element; and
a computer configured to extract a maximum point and a minimum point in a time-dependent change in the temperature of the switching element, the computer being configured to calculate a temperature difference between the maximum point and the minimum point adjacent to each other and being configured to calculate an estimated value of a heat stress to which the switching element is subjected based on each calculated temperature difference and the computer being configured to increase an output of the pump with respect to a predetermined refrigerant temperature as a rate of increase per unit time in the estimated value or a rate of increase per unit traveling distance in the estimated value increases.

7. A heat stress estimation method for a switching element in a motor controller, the switching element being configured to convert output electric power of an electric power supply into motor-driving electric power and the motor controller including a computer, the estimation method comprising:
extracting, by the computer, a maximum point and a minimum point in a time-dependent change in a temperature of the switching element;
calculating, by the computer, a temperature difference from the maximum point to a subsequent minimum point and a temperature difference from the minimum point to a subsequent maximum point; and
calculating, by the computer, an estimated value of a heat stress to which the switching element is subjected based on each calculated temperature difference, wherein the calculation of the estimated value includes following i) and ii);
i) creating, by the computer, a histogram in which a width of a bin is defined by a magnitude of the temperature difference between the minimum point and the maximum point in the time-dependent change in the temperature of the switching element based on each calculated temperature difference,
ii) calculating, by the computer, the estimated value based on the number of occurrences in a created histogram.

8. The estimation method according to claim 7, wherein a contribution of the temperature difference to the estimated value is set to increase as the temperature difference increases.

9. The estimation method according to claim 7, wherein the calculation of the estimated value includes following iii) to v);
iii) determining, by the computer, a reference value of the number of occurrences with respect to each bin in the histogram in advance,
iv) obtaining, by the computer, a ratio of the stored number of occurrences to the reference value for each of the bins, and
v) adding, by the computer, the ratios of all the bins to each other and outputting a value obtained by adding the ratios as the estimated value.

* * * * *